(12) United States Patent
Kluckner et al.

(10) Patent No.: US 11,538,159 B2
(45) Date of Patent: Dec. 27, 2022

(54) METHODS AND APPARATUS FOR LABEL COMPENSATION DURING SPECIMEN CHARACTERIZATION

(71) Applicant: Siemens Healthcare Diagnostics Inc., Tarrytown, NY (US)

(72) Inventors: Stefan Kluckner, Berlin (DE); Patrick Wissmann, Munich (DE); Yao-Jen Chang, Princeton, NJ (US); Terrence Chen, Princeton, NJ (US); Benjamin S. Pollack, Jersey City, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 468 days.

(21) Appl. No.: 16/604,128

(22) PCT Filed: Apr. 10, 2018

(86) PCT No.: PCT/US2018/026948
§ 371 (c)(1),
(2) Date: Oct. 9, 2019

(87) PCT Pub. No.: WO2018/191295
PCT Pub. Date: Oct. 18, 2018

(65) Prior Publication Data
US 2020/0151878 A1 May 14, 2020

Related U.S. Application Data

(60) Provisional application No. 62/485,262, filed on Apr. 13, 2017.

(51) Int. Cl.
*G06T 7/00* (2017.01)
*G06T 7/11* (2017.01)
(Continued)

(52) U.S. Cl.
CPC ..... *G06T 7/0014* (2013.01); *G01N 35/00732* (2013.01); *G06K 9/6215* (2013.01);
(Continued)

(58) Field of Classification Search
CPC ............. G06T 7/0014; G06T 7/11; G06T 2207/10144; G06T 2207/10152;
(Continued)

(56) References Cited

U.S. PATENT DOCUMENTS 7,228,010 B1 * 6/2007 Ghosh ............... G06F 16/10
707/E17.026
8,310,658 B2 11/2012 Wardlaw et al.
(Continued)

FOREIGN PATENT DOCUMENTS

EP 3610269 A1 2/2020
JP 2016-008927 A 1/2016
(Continued)

OTHER PUBLICATIONS

Extended EP Search Report dated Mar. 24, 2020 of corresponding European Application No. 18783693.7, 4 Pages.
(Continued)

*Primary Examiner* — John B Strege

(57) ABSTRACT

A method of characterizing a serum and plasma portion of a specimen in regions occluded by one or more labels. The characterization method may be used to provide input to an HILN (H, I, and/or L, or N) detection method. The characterization method includes capturing one or more images of a labeled specimen container including a serum or plasma portion from multiple viewpoints, processing the one or more images to provide segmentation data including identification of a label-containing region, determining a closest label match of the label-containing region to a reference label configuration selected from a reference label configu-
(Continued)

ration database, and generating a combined representation based on the segmentation information and the closest label match. Using the combined representation allows for compensation of the light blocking effects of the label-containing region. Quality check modules and testing apparatus and adapted to carry out the method are described, as are other aspects.

20 Claims, 10 Drawing Sheets

(51) Int. Cl.
    *G01N 35/00* (2006.01)
    *G06K 9/62* (2022.01)
    *H04N 5/247* (2006.01)
    *G06V 10/22* (2022.01)
    *G06V 10/32* (2022.01)
    *G01N 35/02* (2006.01)

(52) U.S. Cl.
    CPC .............. *G06K 9/6267* (2013.01); *G06T 7/11* (2017.01); *G06V 10/22* (2022.01); *G06V 10/32* (2022.01); *H04N 5/247* (2013.01); *G01N 35/0099* (2013.01); *G01N 35/02* (2013.01); *G01N 2035/00752* (2013.01); *G06T 2207/10144* (2013.01); *G06T 2207/10152* (2013.01)

(58) Field of Classification Search
    CPC ......... G01N 35/00732; G01N 35/0099; G01N 35/02; G01N 2035/00752; G01N 21/9036; G01N 21/909; G01N 21/31; G06K 9/6215; G06K 9/6267; G06V 10/22; G06V 10/32; H04N 5/247
    See application file for complete search history.

(56) References Cited

U.S. PATENT DOCUMENTS

| | | | |
|---|---|---|---|
| 9,322,761 B2 | 4/2016 | Miller | |
| 10,325,182 B2 | 6/2019 | Soomro et al. | |
| 10,746,665 B2 | 8/2020 | Kluckner et al. | |
| 10,746,753 B2 | 8/2020 | Kluckner et al. | |
| 10,816,538 B2 | 10/2020 | Kluckner et al. | |
| 10,824,832 B2 | 11/2020 | Kluckner et al. | |
| 11,009,467 B2 | 5/2021 | Park et al. | |
| 11,022,620 B2 | 6/2021 | Kluckner et al. | |
| 11,035,870 B2 | 6/2021 | Kluckner et al. | |
| 11,042,788 B2 | 6/2021 | Kluckner et al. | |
| 2009/0034782 A1* | 2/2009 | Gering | G06V 20/00 |
| | | | 382/100 |
| 2012/0000983 A1 | 1/2012 | Bhagwan et al. | |
| 2012/0005222 A1 | 1/2012 | Bhagwan et al. | |
| 2012/0138674 A1 | 6/2012 | Chen | |
| 2013/0076882 A1 | 3/2013 | Itoh | |
| 2015/0241457 A1 | 8/2015 | Miller | |
| 2015/0363660 A1* | 12/2015 | Vidal | G06V 10/50 |
| | | | 382/173 |
| 2017/0185815 A1* | 6/2017 | Itoh | G01N 35/00613 |
| 2019/0128908 A1* | 5/2019 | Nakagawa | G01N 15/05 |

FOREIGN PATENT DOCUMENTS

| | | |
|---|---|---|
| JP | 2016-223914 A | 12/2016 |
| WO | 2015/072358 A1 | 5/2015 |
| WO | 2016/133900 A1 | 8/2016 |
| WO | 2016/133908 A1 | 8/2016 |
| WO | 2017/132166 A1 | 8/2017 |
| WO | 2018/188023 A1 | 10/2018 |

OTHER PUBLICATIONS

Robin A Felder: "Automated Specimen Inspection, Quality Analysis, and Its Impact on Patient Safety: Beyond the Bar Code", Clinical Chemistry, vol. 60, No. 3, Mar. 1, 2014 (Mar. 1, 2014), pp. 433-434, XP055672007, ISSN: 0009-9147, DOI: 10.1373/clinchem.2013.219352 *the whole document*.

PCT International Search Report and Written Opinion dated Jun. 28, 2018 (9 Pages).

Ouaviani E et al: "A Common Image Processing Framework for 2D Barcode Reading", Image Processing and Its Applications, 1999. Seventh International Conference on (Conf. Publ. No. 465) Manchester, UK Jul. 13-15, 1999, London, UK.IEE, UK, vol. 2, Jul. 13, 1999 (Jul. 13, 1999), pp. 652-655, XP006501166, DOI: 10.1049/CP:19990404 ISBN: 978-0-85296-717-1.

* cited by examiner

METHODS AND APPARATUS FOR LABEL COMPENSATION DURING SPECIMEN CHARACTERIZATION

CROSS-REFERENCE TO RELATED APPLICATIONS

This application claims priority to U.S. provisional application Ser. No. 62/485,262 filed on Apr. 13, 2017, the contents of which is incorporated herein by reference in its entirety.

FIELD

The present disclosure relates to methods and apparatus for characterizing a specimen, and, more particularly to methods and apparatus for determining if a specimen includes hemolysis (H), icterus (I), and/or lipemia (L), or is normal (N).

BACKGROUND

Automated testing systems may be used to conduct clinical chemistry or assay testing using one or more reagents to identify an analyte or other constituent in a specimen such as urine, blood serum, blood plasma, interstitial liquid, cerebrospinal liquid, or the like. For convenience and safety reasons, these specimens may be contained within specimen containers (e.g., blood collection tubes). The assay or test reactions generate various changes that may be read and/or manipulated to determine a concentration of analyte or other constituent present in the specimen. Such specimen containers may have one and sometimes more than one label provided thereon. The labels(s) may be manufacturer's label and/or a label including information aiding in the identification of the specimen and possibly tests to be performed thereon. In most instances, the information on the label is provided as a printed barcode. The labels may be paper labels.

Improvements in automated testing technology have been accompanied by corresponding advances in pre-analytical specimen preparation and handling operations such as sorting, batch preparation, centrifuging of specimen containers to separate specimen constituents, cap removal to facilitate specimen access, by automated systems, which may be part of a Laboratory Automation System (LAS). The LAS may automatically transport specimens in the specimen containers to one or more pre-analytical specimen processing stations as well as to analyzer stations containing clinical chemistry analyzers and/or assay instruments (hereinafter collectively "analyzers").

These LASs may handle processing of a number of different specimens at one time, and may use the barcode or other identifier on the label for tracking and routing. The label may contain or the barcode may code an accession number that may be correlated to demographic information that may be entered into a hospital's Laboratory Information System (LIS) along with test orders and/or other information. An operator may place the labeled specimen containers onto the LAS system, which may automatically route the specimen containers for one or more pre-analytical operations such as centrifugation, decapping, and aliquot preparation; all of which may be prior to the specimen actually being subjected to clinical analysis or assaying by one or more analyzers that may be part of the LAS.

For certain tests, such as for detection of an interferent, such as H, I, and/or L, a serum or plasma portion obtained from whole blood by fractionation (e.g., by centrifugation) may be subjected to pre-analytical testing. A gel separator may be added to the specimen container to aid in the separation of the settled blood portion from the serum or plasma portion in some embodiments. After fractionation and subsequent pre-analytical testing, in some embodiments the specimen container may be transported to an appropriate analyzer that may extract, via aspiration, serum or plasma portion from the specimen container and combine the serum or plasma portion with one or more reagents in a reaction vessel (e.g., cuvette or other vessel). Analytical measurements may then be performed, often using a beam of interrogating radiation, for example, or by using photometric or fluorometric absorption readings, or the like. The measurements allow determination of end-point or rate values, from which a concentration of analyte or other constituent may be determined using well-known techniques.

Unfortunately, the presence of any interferent (e.g., H, I, and/or L) in the specimen, as a result of a patient condition or sample processing, may possibly adversely affect the test results of the analyte or constituent measurement obtained from the analyzer. For example, the presence of hemolysis in the specimen, which may be unrelated to the patient disease state, may cause a different interpretation of the disease condition of the patient. Moreover, the presence of icterus and/or lipemia in the specimen may also cause a different interpretation of the disease condition of the patient.

In the prior art, the integrity of the serum or plasma portion of the specimen may be visually inspected and rated for a degree of H, I, and/or L (e.g., by assigning an index) or normal (N) by a skilled laboratory technician. This may involve a review of the color of the serum or plasma portion of the specimen against known standards. A normal (N) serum or plasma portion has a light yellow to light amber color. Serum or plasma portion containing hemolysis (H) may have a reddish color. Serum or plasma portion containing icterus (I) may have a dark yellow color due to increased bilirubin, and serum or plasma portion containing lipemia (L) may have a whitish or milky appearance. Depending on the color, the laboratory technician assigns an index value. However, such visual inspection by a person is very subjective, labor intensive, and fraught with the possibility of human error.

Because manual inspection includes the problems listed above, efforts have been undertaken to evaluate the integrity of the specimen without the use of visual inspection by a laboratory technician, but rather by using an automated machine vision inspection method during pre-analytical testing (hereinafter "pre-screening"). However, in some instances, one or more of the above-described labels may be adhered directly to the specimen container. Such label(s) may partially occlude and obscure certain viewpoints of the specimen, so that there may be only one rotational orientation that provides a clear opportunity to visually observe the serum or plasma portion. Thus, automation of such pre-analytical testing has included, for example, rotationally orienting the specimen in such a way that allows for automated pre-screening for HILN.

For example, in some systems, such as those described in U.S. Pat. No. 9,322,761 to Miller entitled "Methods And Apparatus For Ascertaining Interferents And Physical Dimensions in Liquid Samples And Containers To Be Analyzed By A Clinical Analyzer" the specimen container is rotated to find a view window that is unobstructed by the label and the imaging is carried out. However, such systems may be less prone to ease of automation, and may have other problems. Moreover, in some instances, only a small portion of the serum or plasma portion may be visible so that readings on the serum or plasma portion may not involve high confidence levels. Further, in some embodiments, multiple labels may completely obscure the view of the specimen, i.e., wrap 360 degrees about the girth of the specimen container.

Accordingly, there is an unmet need for a method and apparatus adapted to characterize a serum or plasma portion of a specimen, so as to be able to determine a presence of HILN and possibly an extent thereof when the serum or plasma portion is partially or fully occluded by one or more labels.

SUMMARY

According to a first aspect, a characterizing method is provided. The method includes capturing one or more images from multiple viewpoints of a specimen container including a serum or plasma portion, wherein the specimen container includes one or more labels thereon, processing the one or more images from the multiple viewpoints to provide segmentation data for each of the multiple viewpoints, the segmentation data including identification of a label-containing region, providing a reference label configuration database including reference image data on multiple reference label configurations, identifying and selecting a closest label match of the label-containing region to a reference label configuration selected from the multiple reference label configurations contained in the reference label configuration database; and generating a combined representation based on the segmentation data and the closest label match.

According to another aspect, a quality check module is provided. The quality check module includes a plurality of image capture devices arranged around an imaging location, and configured to capture multiple images from multiple viewpoints of a specimen container including one or more labels and containing a serum or plasma portion of a specimen, and a computer coupled to the plurality of image capture devices and adapted to process image data of the multiple images. The computer is configured and capable of being operated to: process the multiple images from the multiple viewpoints to provide segmentation data for each of the multiple viewpoints, the segmentation data including identification of a label-containing region, store a reference label configuration database including reference image data on multiple reference label configurations, determine a closest label match of the label-containing region to a reference label configuration selected from the multiple reference label configurations contained in the reference label configuration database, and generate a combined representation based on the segmentation data and the closest label match.

In another aspect, a specimen testing apparatus adapted to determine presence of an interferent in a specimen contained within a specimen container is provided. The specimen testing apparatus includes a track, and a carrier moveable on the track and configured to contain the specimen container including one or more labels and containing a serum or plasma portion of a specimen, and a plurality of image capture devices arranged around the track and configured to capture multiple images of the specimen container and specimen from multiple viewpoints, and a computer coupled to the plurality of image capture devices and adapted to process image data of the multiple images. The computer is configured and capable of being operated to: process the multiple images from the multiple viewpoints to provide segmentation data for each of the multiple viewpoints, the segmentation data including identification of a label-containing region, store a reference label configuration database including reference image data on multiple reference label configurations, determine a closest label match of the label-containing region to a reference label configuration selected from the multiple reference label configurations contained in the reference label configuration database, and generate a combined representation based on the segmentation data and the closest label match.

Still other aspects, features, and advantages of the present disclosure may be readily apparent from the following description by illustrating a number of example embodiments and implementations, including the best mode contemplated for carrying out the present invention. The present invention may also be capable of other and different embodiments, and its several details may be modified in various respects, all without departing from the scope of the present invention. The disclosure is intended to cover all modifications, equivalents, and alternatives falling within the scope of the appended claims.

BRIEF DESCRIPTION OF THE DRAWINGS

The drawings, described below, are for illustrative purposes and are not necessarily drawn to scale. Accordingly, the drawings and descriptions are to be regarded as illustrative in nature, and not as restrictive. The drawings are not intended to limit the scope of the invention in any way.

DETAILED DESCRIPTION

Figure 1:
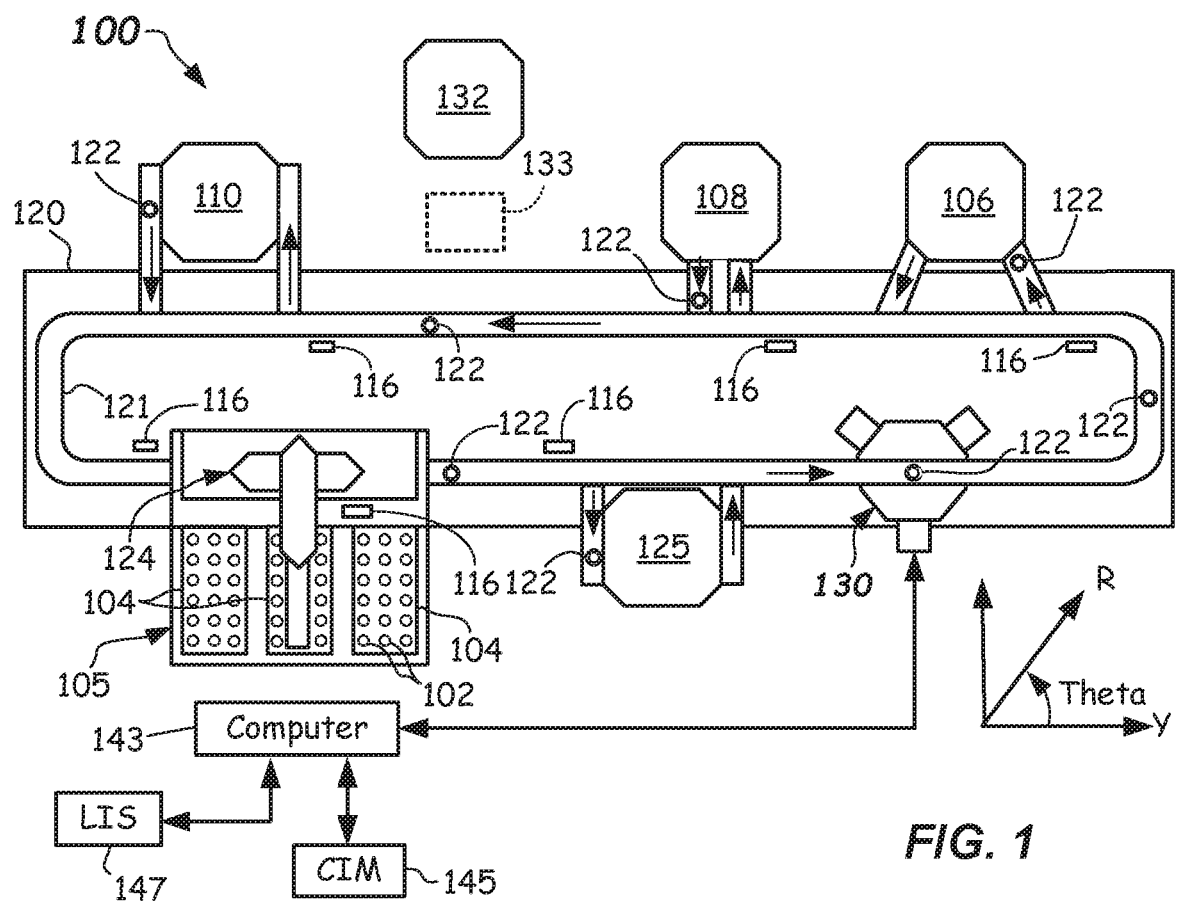
FIG. 1 illustrates a top schematic view of a specimen testing apparatus including one or more quality check modules configured to carry out methods described herein according to one or more embodiments.

During pre-analysis characterization (pre-screening) of a specimen contained in a specimen container, such as at a quality check module, a method is provided which classifies various regions of the specimen container and specimen. In particular, the serum and plasma portion is desired to be classified and identified and differentiated from other regions, such as settled blood portion, and gel separator, if used. Moreover, one or more labels, the specimen container (e.g., tube), air, cap, or even holder may be characterized. Differentiation of the serum and plasma portion from the region comprising one or more labels is a particularly vexing problem because the one or more labels may wrap around the specimen container to various degrees, and may include one, two, or even three or more labels adhered overtop of one another. In some cases, the labels may overlap one another to some extent. Thus, the one or more labels may occlude and obscure one or more views, and in some cases all views of the serum or plasma portion, such that a clear view of the serum or plasma portion may be difficult to obtain. Moreover, in some cases, only a very small portion of the serum or plasma portion is viewable.

Thus, classification of the serum or plasma portion may be challenging due to interference from the one or more labels whose placement and number vary substantially from one specimen container to the next. In particular, the occlusion caused by the one or more labels may heavily influence the spectral responses from various viewpoints, given that the one or more labels may appear on opposing sides of the specimen container and may involve multiple layers.

Accordingly, given the challenges described above, in a first broad aspect, embodiments of the present disclosure provide methods, apparatus, and systems configured to determine the presence and extent (i.e., a configuration of) of one or more labels that are provided on the specimen container. Additionally, given the presence of the label, the methods, apparatus, and systems allow for suitable adjustments to the spectral responses so that the influence of the label(s) may be characterized and removed. As such, a larger region of the serum or plasma region may be available and characterized and thus may be used for determination of the extent of H, I, and/or L or a determination of being N.

In first embodiments, a characterization method is provided. The characterization methods comprise capturing one or more images from multiple viewpoints of a specimen container including a serum or plasma portion, wherein the specimen container includes one or more labels thereon. The one or more images from the multiple viewpoints are processed by a computer to provide segmentation data for each of the multiple viewpoints. The segmentation data includes identification of a label-containing region of the specimen container, and may also include segmentation information on the location of the serum or plasma portion, and even the settled blood portion, the tube, air, cap, and/or holder. The method includes providing a reference label configuration database including reference image data on multiple reference label configurations. The reference label configurations are a multitude of possible label configurations including, for example, one label, two labels, three labels, or even more labels arranged in different possible configurations (orientations) that may be actually encountered during imaging. The reference label configuration database may be made up of sub-databases capable of being indexed.

In accordance with another aspect, the method determines a closest label match of the label-containing region to a reference label configuration selected from the multiple reference label configurations contained in the reference label configuration database. A combined representation is generated based on the segmentation information and the closest label match. This combined representation may then be supplied to a HILN classifier to provide a better characterization of the serum or plasma portion because the effect of the label has been compensated for. As a result, an improved characterization of HILN of the serum or plasma portion may be obtained using the method. Further, improved HIL level characterization may be achieved.

Definitions

"Interferent," as used herein, means the presence of at least one of hemolysis (H), icterus (I), or lipemia (L) in the serum or plasma portion of the specimen. Hemolysis (H), icterus (I), and lipemia (L) are collectively referred to as "HIL" herein.

"Hemolysis" is defined as a condition in the serum or plasma portion wherein during processing red blood cells are destroyed, which leads to the release of hemoglobin from the red blood cells into the serum or plasma portion such that the serum or plasma portion takes on a reddish hue. The degree of Hemolysis may be quantified by assigning a Hemolytic Index.

"Icterus" is defined as a condition of the blood where the serum or plasma portion is discolored dark yellow caused by an accumulation of bile pigment (bilirubin). The degree of Icterus may be quantified by assigning an Icteric Index.

"Lipemia" is defined as a presence in the blood of an abnormally high concentration of emulsified fat, such that the serum or plasma portion includes a whitish or milky appearance. The degree of lipemia may be quantified by assigning a Lipemic Index.

"Serum or plasma portion" is the liquid component of blood. It is found above the settled blood portion after fractionation (e.g., by centrifugation). Plasma and serum differ in the content of coagulating components, primarily fibrinogen. Plasma is the un-clotted liquid, whereas serum refers to blood plasma, which has been allowed to clot either under the influence of endogenous enzymes or exogenous components.

"Settled blood portion" is a packed semi-solid made up blood cells such as white blood cells (leukocytes), red blood cells (erythrocytes), and platelets (thrombocytes), which are aggregated and separated from the serum or plasma portion. The settled blood portion is found at a bottom part of the specimen container below the serum or plasma portion after fractionation.

"Image capture device" is any device capable of capturing a pixelated image (e.g., digital image) for analysis, such as a digital camera, a CCD (charge-coupled device) and CMOS (complementary metal-oxide semiconductor), an array of sensors, or the like.

"Pixelated image" as used herein means images including either single pixels or a grouping of pixels, such as a super-pixel or image patch including more than one pixel. A super pixel or image patch having a size of 11 individual pixels by 11 individual pixels was found to work well for efficient processing of the image data.

"Label" is defined as an area on an outside surface of the specimen container adapted to contain identification information (i.e., indicia). The label may be an opaque paper, plastic, paint, or other material applied (e.g., adhered) to an outer surface of the specimen container. Indicia may be a barcode, alphabetic characters, numeric characters, or combinations thereof. The label may be manufacturer label or may be a label after-applied by a phlebotomist or by a subsequent specimen processing entity.

"LA" is defined as the liquid-air interface and is a line of demarcation (viewed laterally) between the serum or plasma portion and the air above the serum or plasma portion.

"SB" is the serum-blood interface, which is a line of demarcation (viewed laterally) between the serum or plasma portion and the settled blood portion.

"TC" is the tube-cap interface, which is a line of demarcation (viewed laterally) at the interface between the air and the cap.

"HT" is the height of the tube and is defined as the height from the bottom-most part of the tube to the bottom of the cap.

"HSP," in cases where no gel separator is used, is the height of the serum or plasma portion and is defined as the height from the top of the serum or plasma portion from the top of the settled blood portion, i.e., from LA to SB.

"HSP," in cases where a gel separator is used (FIG. 2B), is the height of the serum or plasma portion and is defined as the height from the top of the serum or plasma portion at LA to the top of the gel separator at SG, i.e., from LA to SG.

"HSB," in cases where no gel separator is used, is the height of the settled blood portion and is defined as the height from the bottom of the settled blood portion to the top of the settled blood portion at SB.

"HSB," in cases where a gel separator is used, is the height of the settled blood portion and is defined as the height from the bottom of the settled blood portion to the bottom of the gel separator at BG.

"HTOT," in cases where there is no gel separator is used, is the total height of the specimen and equals HSP+HSB.

"HTOT," in cases where a gel separator is used, is a total height of the specimen, and equals HSP+HSB+height of the gel separator.

"Tw" is the wall thickness of the specimen container.

"W" is an outer width of the specimen container.

"Wi" is an inner width of the specimen container.

"Carrier" is a device that is configured to support and transport a specimen container, such as within a laboratory automation system (LAS).

"VSP" is a volume of the serum or plasma portion in the specimen container.

"VSB" is a volume of the settled blood portion in the specimen container.

"Hemolytic index" as used herein means a grade given to a particular specimen based upon the determined content (degree or amount) of hemolysis present in the serum or plasma portion.

"Icteric index" as used herein means the grade given to a particular specimen based upon a determined content (degree or amount) of icterus present in the serum or plasma portion.

"Lipemic index" as used herein means the grade given to a serum or plasma portion based upon the determined content (degree or amount) of lipemia present in the serum or plasma portion.

The presence of one or more interferent (HIL) in the serum or plasma portion, as discussed above, may affect the interpretation of results of the subsequent testing by the one or more analyzers (e.g. clinical chemistry or assay testing). Thus, the ability to pre-screen for HILN before analysis by one or more analyzers may advantageously minimize wasted time analyzing specimens that are not of the proper quality for analysis. Moreover, in one or more embodiments, remedial action can take place after pre-screening where H, I, and/or L are found.

The specimen, as described herein, is collected in a specimen container, such as a blood collection tube and may include a settled blood portion and a serum and plasma portion after fractionation (e.g., separation by centrifugation). In some specimen containers, a small gel separator may be used, which positions itself between the settled blood portion and the serum or plasma portion during centrifugation. The gel separator serves as a physical barrier between the two portions (liquid and semi-solid, settled blood cells), and may minimize remixing thereof. The specimen containers may be of different sizes and thus may be supplied to the analyzers in a number of different configurations. For example, the specimen containers may have sizes such as 13 mm×75 mm, 13 mm×100 mm, 16 mm×100 mm, and 16 mm×125 mm, for example. Other suitable sizes may be used.

In accordance with one or more embodiments, the characterization method may improve the characterization of the label and thus of the serum or plasma portion occluded by the label. The improved label characterization may be used to provide a better classification of the serum or plasma portion in regions where the backlight is obscured by the label and, in turn, may improve the results of an interferent detection and quantification methods. In particular, the improved method provides a combined representation that helps to better guide the classifier to compensate for the change is light intensity based on any label disturbance/occlusion.

The characterization and interferent detection methods may be carried out as part of pre-screening, i.e., taking place before carrying out analysis on an analyzer (e.g., clinical chemistry or assaying instrument). The interferent detection method is useful to detect H, I, and/or L or N, as described herein. The methods may, in some embodiments, use high dynamic range (HDR) image processing of the specimen container and serum or plasma portion to determine the presence of an interferent (H, I, and/or L or N). In some embodiments, the identification of the physical boundaries of the serum or plasma portion and a label-containing region may also take place during a segmentation process by using HDR image processing.

In one or more embodiments, a quality check module may be configured to carry out the characterization methods. The quality check module may be provided in any suitable area where a robotic mechanism (e.g., a track or gripper-finger robot) may facilitate transport of specimens contained in specimen containers to the quality check module. In some embodiments, the quality check module may be provided on or along the track of a specimen testing apparatus, where the track carries the specimens to remote locations for analysis (e.g., clinical chemistry testing or assaying) on an analyzer if pre-screening of the specimen determines it to be normal (N). In some embodiments, the quality check module may be provided directly on the track so that the specimen may be characterized and tested for the presence of an interferent while being resident on the track.

In embodiments, the specimen container may be held in an upright position by a specimen container holder (hereinafter "holder"). The holder may include fingers or other suitable articles that hold the specimen container during capture of the image data.

In further embodiments, the image data obtained may also be used for other purposes, such as artifact detection (e.g., the detection of clot, bubble, or foam in the serum or plasma portion). In some cases, the pixels that are found to contain an artifact may simply be ignored in carrying out the determination of HILN based upon the processed segmentation data, as the artifact location(s) and its extent is known.

Should the specimen be found to contain one or more of H, I, and L, a suitable notice may be provided to the operator, and/or may be taken off line to perform a remediation to rectify the one or more of H, I, or L, for further quantification of H, I, or L to more accurately measure an extent of the interferent that is present, for a redraw, for transfer to another container, or for other processing.

In some instances, where the characterization method determines that the specimen container is so occluded by labels that it is determined that HILN characterization of the specimen may be suspect (e.g., too many labels), the operator may be notified via suitable notice (alarm, signal, or other suitable flag) so that the specimen may be removed or otherwise transferred to another specimen container to be pre-screened again, which may possibly involve re-fractionation.

The methods described herein are image based, i.e., based on pixelated images (e.g., digital images). The images may be obtained by multiple image capture devices located so as to capture images from multiple viewpoints. The multiple images may be obtained at the quality check module, and may be captured at multiple exposure times while providing illumination at multiple spectra having different nominal wavelengths. The multiple spectra of illumination may include, for example red, green, blue, white, IR and near IR, for example. The illumination may include backlit illumination (wherein the image capture device is on one side and the backlight source is on an opposite side of the specimen container). The exposure time may be varied based upon the lighting intensity and spectrum used and features of the image capture devices. Multiple exposure times may be used for each spectrum and for each image capture device.

For each corresponding pixel of the multiple captured images at a particular spectrum (at different exposure times), pixels exhibiting optimal image intensity may be selected. The result may be a plurality of consolidated color image data sets for each different spectrum (e.g., red, green, blue, white, IR, near IR) where all of the pixels are optimally exposed (e.g., one image data set per spectrum). The data from the consolidated color data sets may be subject to statistical analysis to determine statistical data on each pixel (e.g., mean, standard deviation, and covariance matrix) thereof. Covariance is a measure of how much two or more of the color pixels change together. This statistical data, in the form of one or more data matrices, can then be operated on by or more multi-class classifiers in order to segment the image data set into predefined classes (hereinafter "segmentation").

The segmentation may determine and identify the boundaries of the region of serum or plasma portion in the image, as well as classes of other regions (e.g., label, settled blood portion, gel separator, tube, cap, holder, and/or air). The multi-class classifier may be a support vector machine (SVM) or a random decision tree that has been pre-trained from multiple training sets. However, other types of segmentation may be employed. Any suitable program or toolbox may be used for segmentation by classification and training tasks, such as Matlab, various C++ tools, or even cloud-based programs.

Once the region comprising serum or plasma portion and the label-containing region are appropriately identified, a combined representation can be generated as part of the characterization method. Thereafter, one or more interferent classifiers may be used to directly identify and classify the presence of an interferent (e.g., H, I, and/or L) or normality (N). The one or more interferent classifiers may be individually trained binary models that may classify each pixel (or superpixel/image patch) as being H, I, or L, or N, respectively. In other embodiments, the interferent classifier may be a multi-class classifier. The interferent classifier models may each also be a support vector machine (SVM) or a random decision tree. Other suitable classifiers may be used.

Although using the images from multiple viewpoints can provide acceptable results in terms of properly characterizing HILN when a sufficient region of the serum or plasma portion is viewable and not occluded, it has been discovered by the inventors herein that the presence of the one or more labels on the specimen container can affect the intensity values of the image captured. For example, if the label is located on the backside of the specimen container from one viewpoint, the presence of the label may obscure the back light that can pass through the serum or plasma portion and thus affect the image intensity that is being measured by the image capture device at that viewpoint. Embodiments of the present disclosure account for the presence of such label and provide for a better and more accurate assessment of the image intensity for the serum or plasma portion. From this improved characterization, a more accurate determination of HILN may be provided.

Moreover, based upon the more accurate characterization, an improved determination of interferent level for the interferent type(s) may also be optionally provided. The interferent level may be based upon one or more additional models (e.g., one or more regression models), for example. The regression models may be trained for each interferent type based upon sample specimens that exhibit diverse interference levels. More than one interferent type may be determined by the method, and an interferent index for each interferent type may be specified.

Further details of inventive characterization methods, quality check modules configured to carry out the methods, and specimen testing apparatus including one or more quality check modules will be further described with reference to FIGS. 1-7 herein.

FIG. 1 illustrates a specimen testing apparatus 100 capable of automatically processing multiple specimen containers 102 (e.g., see FIGS. 2A-3E). The specimen containers 102 may be contained in one or more racks 104 at a loading area 105 prior to transportation to and analysis by one or more analyzers (e.g., first, second, and third analyzer 106, 108, 110, respectively, arranged about the specimen testing apparatus 100). More or less numbers of analyzers can be used. The analyzers may be any combination of clinical chemistry analyzers and/or assaying instruments, or the like. The specimen containers 102 may be any suitably transparent or translucent container, such as a blood collection tube, test tube, sample cup, cuvette, or other clear or opaque glass or plastic container capable of containing and imaging of the specimen 212. The specimen containers 102 may be varied in size.

Specimens 212 (FIGS. 2A-3E) to be automatically pre-screened and then processed may be provided to the specimen testing apparatus 100 in the specimen containers 102, which may be capped with a cap 214. The caps 214 may have different shapes and/or colors (e.g., red, royal blue, light blue, green, grey, tan, yellow, or color combinations), which may have meaning in terms of what test the specimen container 102 is used for, the type of additive included therein, whether the container includes a gel separator, or the like. Other colors may be used.

Figure 3B:
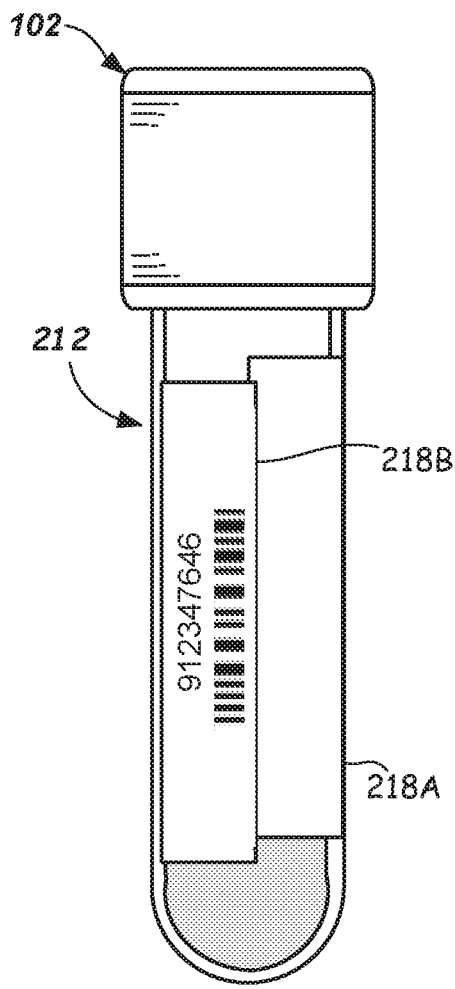
FIG. 3B illustrates a side view of a specimen container including multiple labels occluding and obscuring the serum or plasma portion from one lateral viewpoint.
Figure 3C:
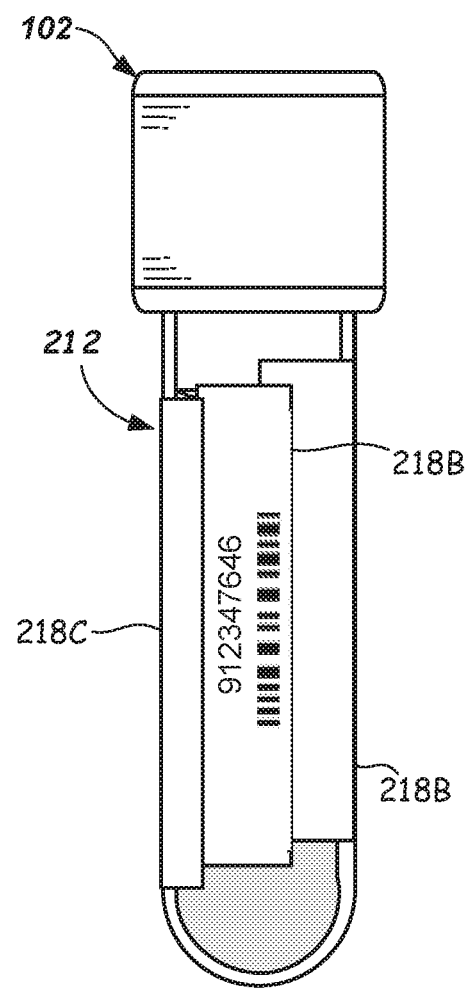
FIG. 3C illustrates a side view of a specimen container including multiple labels occluding and obscuring at least part of the serum or plasma portion from at least two lateral viewpoints.
Figure 3D:
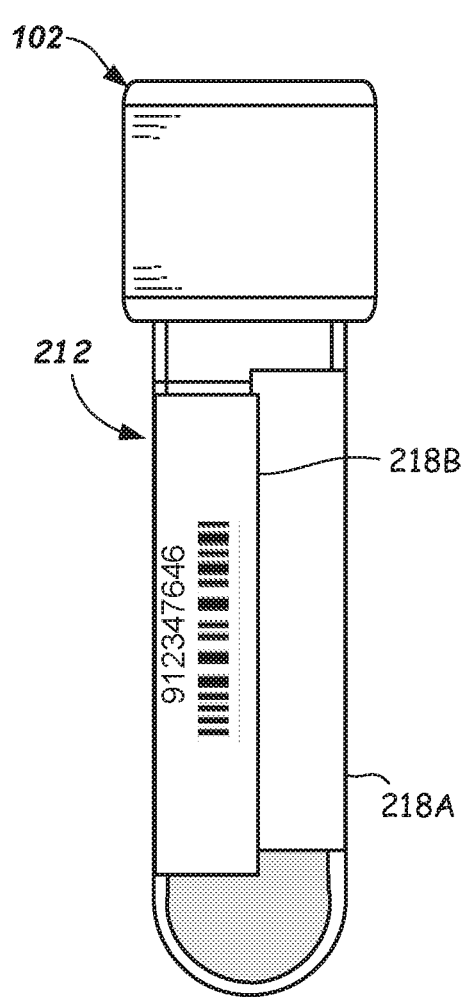
FIGS. 3D and 3E illustrate respective front and back side views of a specimen container including multiple labels wrapping about a girth of the specimen container and entirely occluding and obscuring the serum or plasma portion from any viewpoint.
Figure 3E:
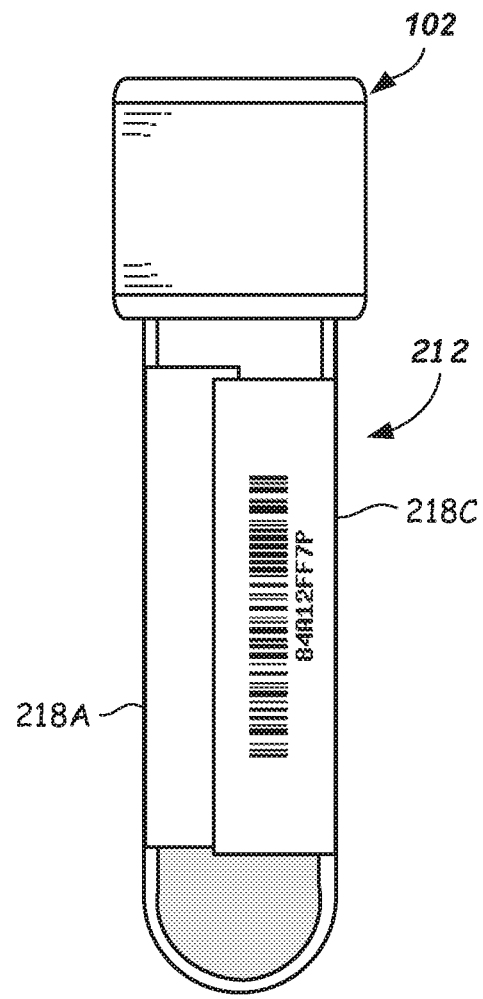

Each of the specimen containers 102 may be provided with a label 218 including identification information 218i (i.e., indicia), such as a barcode, alphabetic, numeric, or combination thereof that may be machine readable at various locations about the specimen testing apparatus 100. The machine readable information may be darker (e.g., black) than the label material (e.g., white paper) so that it is readily imaged. The identification information 218i may indicate, or may otherwise be correlated to, via a Laboratory Information System (LIS) 147, a patient's identification as well as tests to be accomplished upon the specimen 212, or other information, for example. Such identification information 218i may be provided on a label 218 adhered to an outside surface of the tube 215. The label 218 may not extend all the way around the specimen container 102, or all along a length of the specimen container 102. However, in some embodiments multiple labels 218A, 218B, and/or 218C may have been adhered (such as from multiple facilities that have handled the specimen container 102), and they may overlap to some extent. For example, in some embodiments as shown in FIG. 3B, two labels (e.g., labels 218A, 218B) are shown as overlapping and occluding at least one viewpoint. In other embodiments, 3 or more labels (e.g., labels 218A-218C) may be provided on top of one another or overlapping one another or both, such as shown in FIG. 3C thus occluding two or more, or even all of the lateral viewpoints.

Figure 2A:
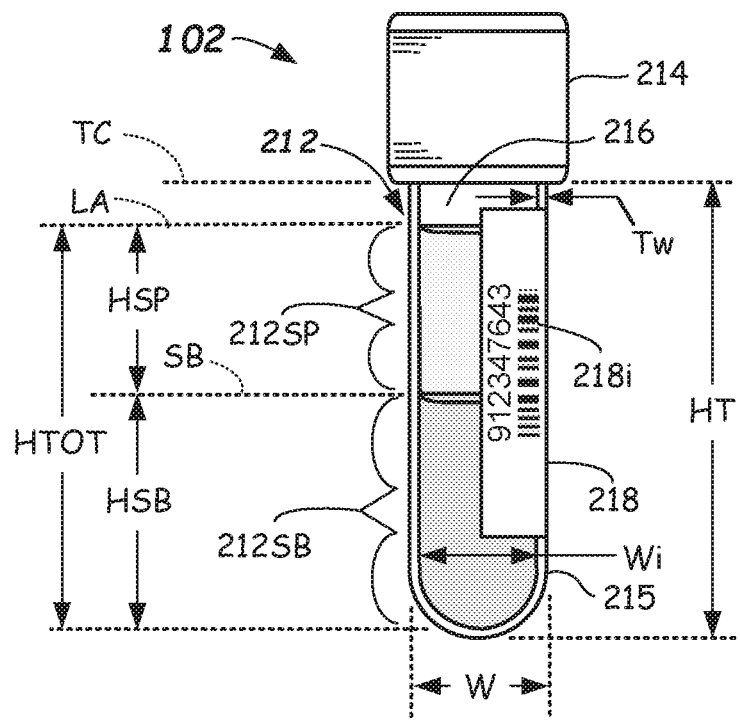
FIG. 2A illustrates a side view of a specimen container including a separated specimen having a serum or plasma portion containing an interferent, and wherein the specimen container includes a label (e.g., a barcode label) applied thereon.
Figures 2B, 3A:
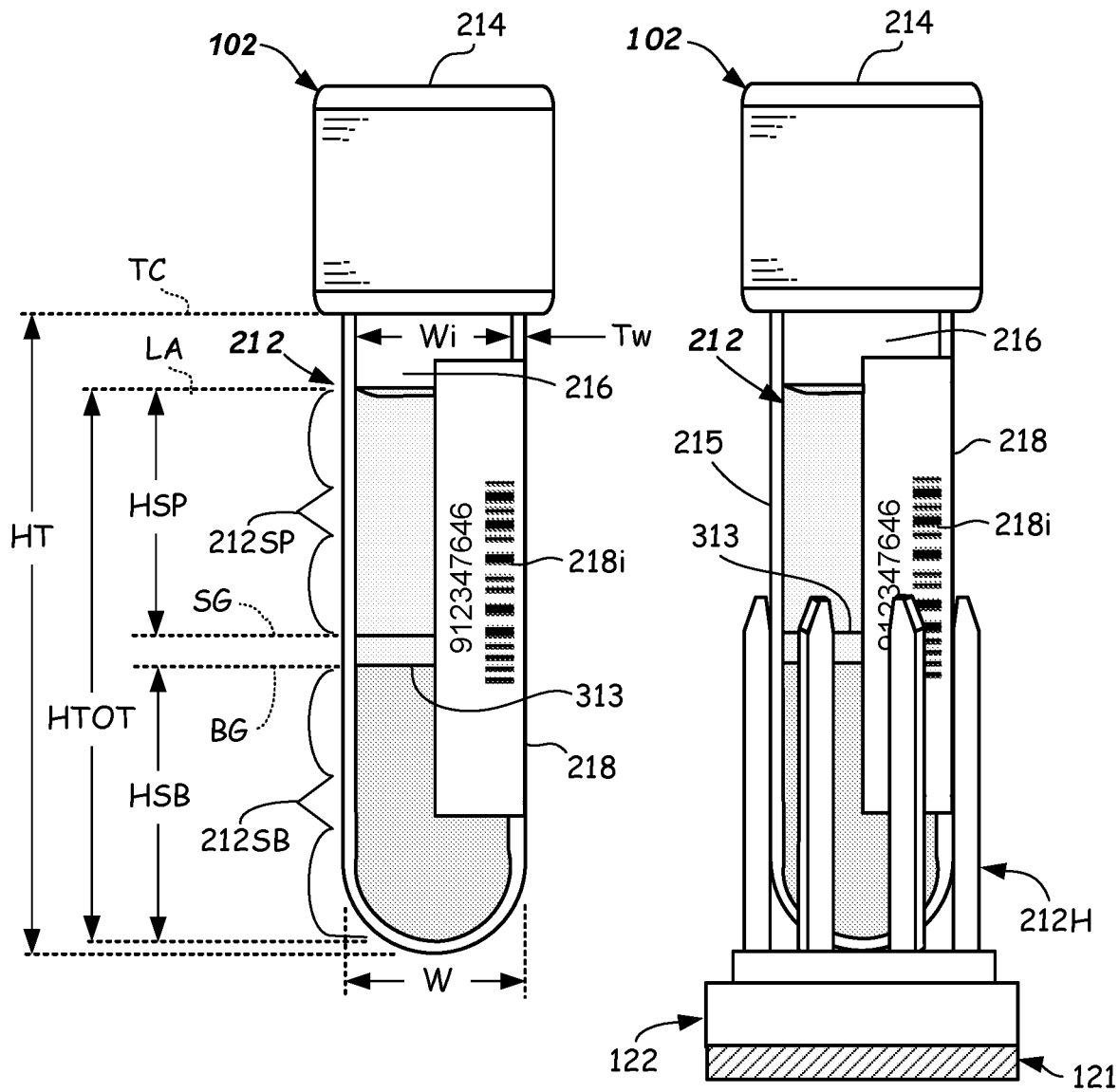
FIG. 2B illustrates a side view of a specimen container including a label, a separated specimen including a serum or plasma portion containing an interferent, and further including a gel separator.
FIG. 3A illustrates a side view of a specimen container including a label, a separated specimen containing an interferent in the serum or plasma portion, a gel separator, and wherein the specimen container is shown being held in an upright orientation in a holder.

In many embodiments, although the label(s) 218 may occlude some portion of the specimen 212, some portion of the specimen 212 and serum and plasma portion 212SP may still be viewable from at least one viewpoint (See FIGS. 2A and 2B). In some embodiments, however, the labels 218 may extend more fully around or entirely around the girth of the specimen container 102 so as to occlude two viewpoints or even fully occlude the serum or plasma portion 212SP of the specimen 212 so that it is not viewable from any lateral direction. This full-occluded case, and cases where only a small portion of the serum or plasma portion 212SP is viewable in only one viewpoint is where embodiments of the present disclosure provide improved characterization of the serum or plasma portion 212SP. However, the present methods will improve characterization in cases even where only one viewpoint is obscured by one or more labels.

Again referring to FIG. 2A, the specimen 212 may include a serum or plasma portion 212SP and a settled blood portion 212SB contained within the tube 215. Air 216 may be provided above the serum and plasma portion 212SP and a line of demarcation between them is defined as the liquid-air interface (LA). A line of demarcation between the serum or plasma portion 212SP and the settled blood portion 212SB is defined as the serum-blood interface (SB). The interface between the air 216 and cap 214 is defined as the tube-cap interface (TC). The height of the tube (HT) is a height from the bottom-most part of the tube 215 to the bottom of the cap 214, and may be used for determining tube size. The height of the serum or plasma portion 212SP is (HSP) and is defined as a height from the top of the serum or plasma portion 212SP from the top of the settled blood portion 212SB, i.e., from LA to SB. The height of the settled blood portion 212SB is (HSB) and is defined as a height from the bottom of the settled blood portion 212SB to the top of the settled blood portion 212SB at SB. HTOT is a total height of the specimen 212 and equals HSP plus HSB.

In cases where a gel separator 313 is used (FIG. 2B), the height of the serum or plasma portion 212SP is (HSP) and is defined as the height from the top of the serum or plasma portion 212SP at LA to the top of the gel separator 313 at SG, i.e., from LA to SG. The height of the settled blood portion 212SB is (HSB) and is defined as the height from the bottom of the settled blood portion 212SB to the bottom of the gel separator 313 at BG. HTOT is the total height of the specimen 212 and equals HSP plus HSB plus height of the gel separator 313. In each case, Tw is the wall thickness, W is the outer width that may be used to determined tube size, and Wi is the inner width of the specimen container 102.

In more detail, specimen testing apparatus 100 may include a base 120 (e.g., a frame, floor, or other structure) upon which a track 121 may be mounted. The track 121 may be a railed track (e.g., a mono rail or a multiple rail), a collection of conveyor belts, conveyor chains, moveable platforms, or any other suitable type of conveyance mechanism. Track 121 may be circular or any other suitable shape and may be a closed track (e.g., endless track) in some embodiments. Track 121 may, in operation, transport individual ones of the specimen containers 102 to locations spaced about the track 121 in carriers 122.

Carriers 122 may be passive, non-motored pucks that may be configured to carry a single specimen container 102 on the track 121, or optionally, an automated carrier including an onboard drive motor, such as a linear motor that is programmed to move about the track 121 and stop at pre-programmed locations. Carriers 122 may each include a holder 122H (FIG. 3A) configured to hold the specimen container 102 in a defined upright position and orientation. The holder 122H may include a plurality of fingers or leaf springs that secure the specimen container 102 on the carrier 122, but are moveable or flexible to accommodate different sizes of specimen containers 102. In some embodiments, carriers 122 may leave from the loading area 105 after being offloaded from the one or more racks 104. In some embodiments, loading area 105 may serve a dual function of also allowing reloading of the specimen containers 102 from the carriers 122 to the loading area 105 after analysis is completed.

A robot 124 may be provided at the loading area 105 and may be configured to grasp the specimen containers 102 from the one or more racks 104 and load the specimen containers 102 onto the carriers 122, such as on an input lane of the track 121. Robot 124 may also be configured to reload specimen containers 102 from the carriers 122 to the one or more racks 104 upon completion of testing. The robot 124 including one or more (e.g., least two) robot arms or components capable of X (lateral) and Z (vertical), Y and Z, X, Y, and Z, or r (radial) and theta (rotational) motion. Robot 124 may be a gantry robot, an articulated robot, an R-theta robot, or other suitable robot wherein the robot 124 may be equipped with robotic gripper fingers oriented, sized and configured to pick up and place the specimen containers 102.

Upon being loaded onto track 121, the specimen containers 102 carried by carriers 122 may progress to a first pre-processing station 125. For example, the first pre-processing station 125 may be an automated centrifuge configured to carry out fractionation of the specimen 212. Carriers 122 carrying specimen containers 102 may be diverted to the first pre-processing station 125 by inflow lane or other suitable robot. After being centrifuged, the specimen containers 102 may exit on outflow lane, or otherwise be removed by a robot, and continue along the track 121. In the depicted embodiment, the specimen container 102 in carrier 122 may next be transported to a quality check module 130 to be further described herein with reference to FIGS. 4A and 4B.

The quality check module 130 is configured to pre-screen and carry out the characterization methods described herein, and may be adapted for automatically determining a presence and possibly the extent of H, I, and/or L contained in a specimen 212 or N. If found to contain effectively-low amounts of H, I and/or L so as to be considered normal (N), the specimen 212 may continue on the track 121 and then may be analyzed by the one or more analyzers (e.g., first, second and third analyzers 106, 108, and/or 110). Thereafter, the specimen container 102 may be returned to the loading area 105 for reloading to the one or more racks 104. In some embodiments, the specimen 212 may also be tested for the presence of an artifact (e.g., clot, bubble, or foam) at the quality check module 130. The testing for the presence of an artifact may be as disclosed in U.S. Provisional Patent App. 62/288,358 filed Jan. 28, 2016, and entitled "Methods And Apparatus For Classifying An Artifact In a Specimen."

In some embodiments, in addition to HILN detection, quantification of the specimen 212 may take place at the quality check module 130 (i.e., determination of HSP, HSB, HTOT, and determination of location of SB or SG, and LA). In some embodiments, characterization of the physical attributes (e.g., size) of the specimen container 102 may take place at the quality check module 130. Such characterization may include determining HT and W, and may also determine cap color, cap type, TC, and/or Wi. From this characterization, the size of the specimen container may be extracted. The size may be used as part of an indexer to a reference label configuration database to be described below herein.

In some embodiments, a remote station 132 may be provided on the specimen testing apparatus 100 wherein the remote station 132 is not directly linked to the track 121. For instance, an independent robot 133 (shown dotted) may carry specimen containers 102 containing specimens 212 to the remote station 132 and return them after testing/pre-processing. Optionally, the specimen containers 102 may be manually removed and returned. Remote station 132 may be used to test for certain constituents, such as a hemolysis level, or may be used for further processing, such as to lower a lipemia level through one or more additions and/or additional processing, or to remove a clot, bubble or foam, for example. Other testing or processing including pre-screening using the characterization method and/or HILN detection methods described herein may be accomplished on remote station 132.

Other remote stations may be provided at one or more locations on or along the track 121. The additional stations may include a de-capping station, one or more additional quality check modules 130, or the like.

The specimen testing apparatus 100 may include a number of sensors 116 at one or more locations around the track 121. Sensors 116 may be used to detect a location of specimen containers 102 along the track 121 by means of reading the identification information 218i placed on the specimen container 102, or like information (not shown) provided on each carrier 122. In some embodiments, a distinct RFID chip may be embedded in each carrier 122 and conventional RFID reader system may be employed in the tracking operation, for example. Other means for tracking the location may be used, such as proximity sensors. All of the sensors 116 may interface with the computer 143, so that the location of each specimen container 102 may be appropriately known at all times.

First pre-processing station 125 and each of the analyzers 106, 108, 110 may be equipped with robotic mechanisms and/or inflow lanes configured to remove carriers 122 from the track 121, and robotic mechanisms and/or outflow lanes configured to reenter carriers 122 to the track 121.

Specimen testing apparatus 100 may be controlled by the computer 143, which may be a microprocessor-based central processing unit CPU, having a suitable memory and suitable conditioning electronics and drivers for operating the various system components. Computer 143 may be housed as part of, or separate from, the base 120 of the specimen testing apparatus 100. The computer 143 may operate to control movement of the carriers 122 to and from the loading area 105, motion about the track 121, motion to and from the first pre-processing station 125 as well as operation of the first pre-processing station 125 (e.g., centrifuge), motion to and from the quality check module 130 as well as operation of the quality check module 130, and motion to and from each analyzer 106, 108, 110 as well as operation of each analyzer 106, 108, 110 for carrying out the various types of testing (e.g., assay or clinical chemistry).

For all but the quality check module 130, the computer 143 may control the specimen testing apparatus 100 according to software, firmware, and/or hardware commands or circuits such as those used on the Dimension® clinical chemistry analyzer sold by Siemens Healthcare Diagnostics Inc. of Tarrytown, N.Y., and such control is typical to those skilled in the art of computer-based electromechanical control programming and will not be further described herein. However, other suitable systems for controlling the specimen testing apparatus 100 may be used. The control of the quality check module 130 may also be provided by the computer 143, but according to the inventive methods, as described in detail herein.

Embodiments of the disclosure may be implemented using a computer interface module (CIM) 145 that allows for a user to easily and quickly access a variety of control and status display screens. These control and status display screens may describe some or all aspects of a plurality of interrelated automated devices used for preparation and analysis of specimens 212. The CIM 145 may employed to provide information about the operational status of a plurality of interrelated automated devices as well as information describing the location of any specimen 212 as well as a status of tests to be performed on, or being performed on, the specimen 212. The CIM 145 is thus adapted to facilitate interactions between an operator and the specimen testing apparatus 100. The CIM 145 may include a display screen adapted to display a menu including icons, scroll bars, boxes, and buttons through which the operator may interface with the specimen testing apparatus 100. The menu may comprise a number of function buttons programmed to display functional aspects of the specimen testing apparatus 100.

Figure 4A:
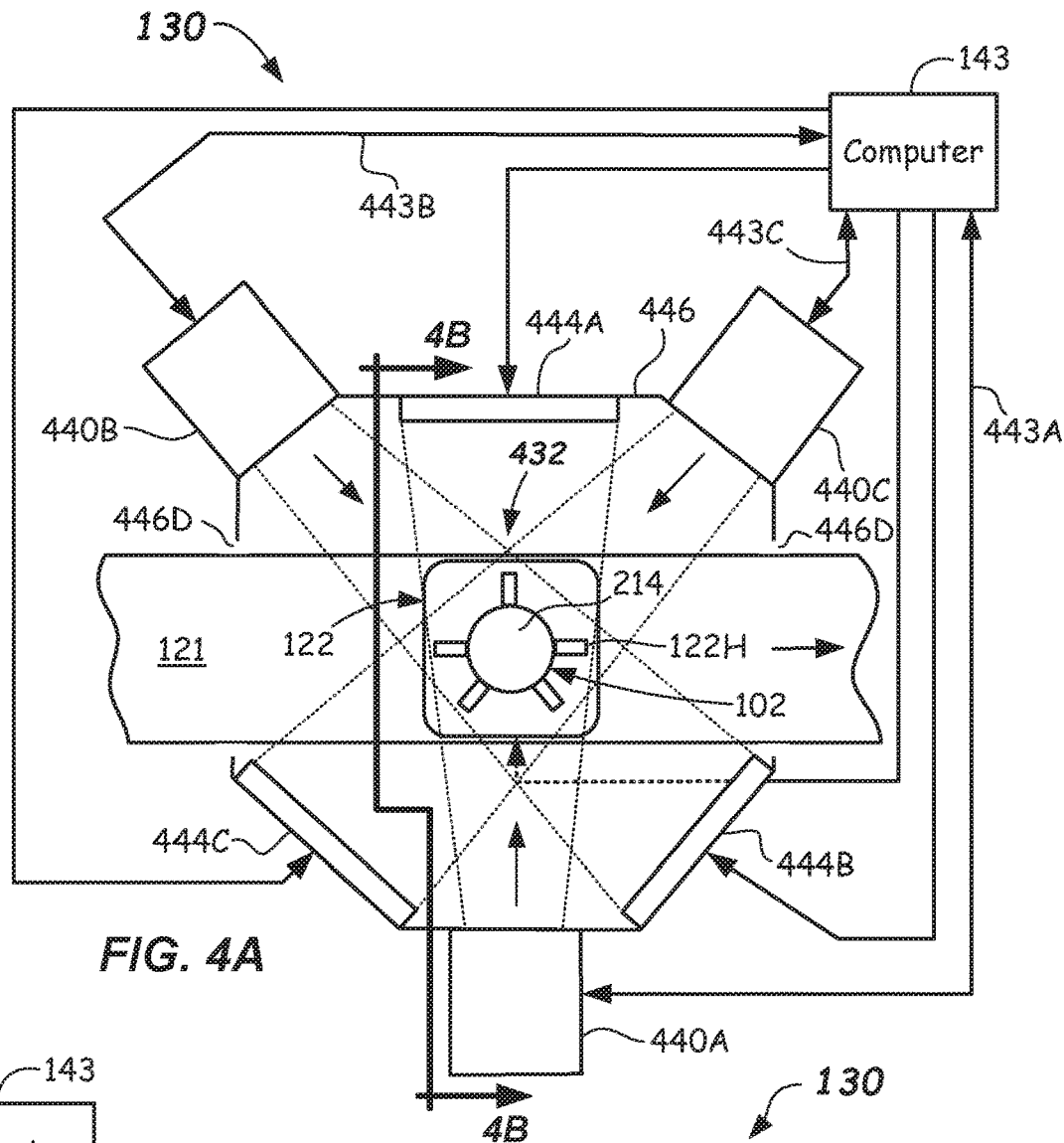
FIG. 4A illustrates a schematic top view of a quality check module (with ceiling removed) including multiple viewpoints and configured to capture and analyze multiple back-lit images to enable characterization of the specimen and determining a presence of an interferent according to one or more embodiments.
Figure 4B:
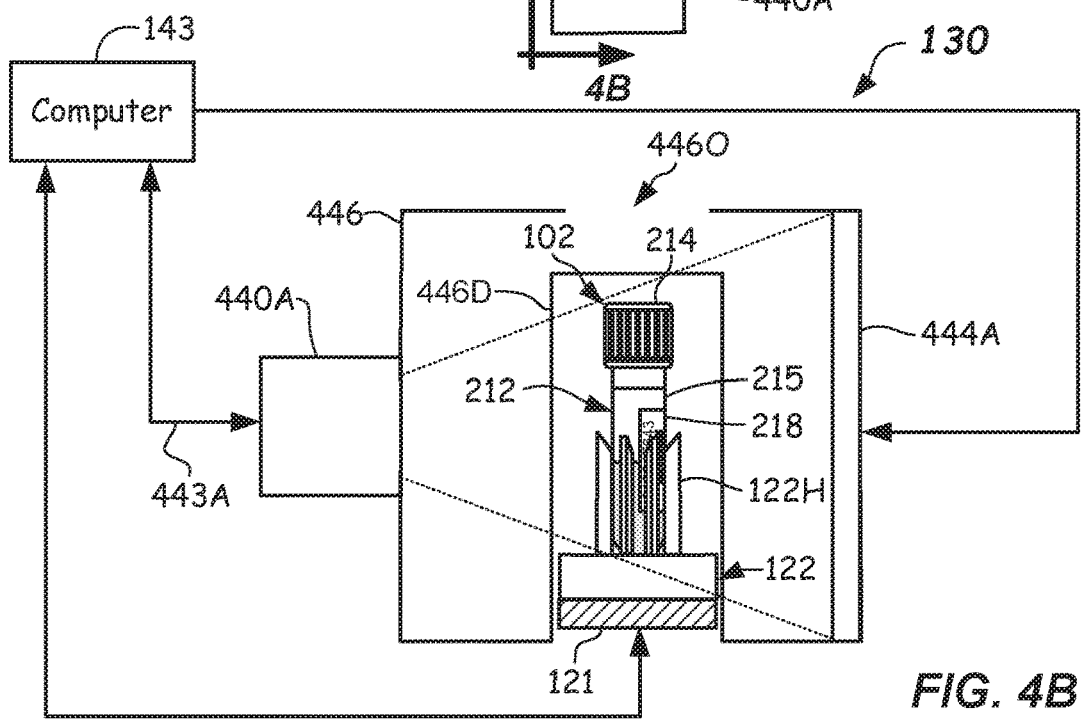
FIG. 4B illustrates a schematic side view of the quality check module (with front enclosure wall removed) of FIG. 4A taken along section line 4B-4B according to one or more embodiments.

With reference to FIGS. 4A-4B, a first embodiment of a quality check module 130 is shown and described. Quality check module 130 may be configured and adapted to carry out the characterization method and may also be used to automatically determine a presence of an interferent (e.g., H, I, and/or L) in a specimen 212 (e.g., in a serum or plasma portion 212SP thereof) prior to analysis by the one or more analyzers 106, 108, 110. Pre-screening in this manner allows for additional processing, additional quantification or characterization, discarding, or redraw of a specimen 212 without wasting valuable analyzer resources or possibly having the presence of an interferent affect the veracity of the test results.

In addition to the characterization methods and interferent detection methods described herein, other detection methods may take place on the specimen 212 contained in the specimen container 102 at the quality check module 130. For example, a method may be carried out at the quality check module 130 to quantify the specimen 212, i.e., determine certain physical dimensional characteristics of the specimen 212 (e.g., LA and SB, and/or determination of HSP, HSB, and/or HTOT). Quantification may also involve estimating a volume of the serum or plasma portion (VSP) and/or a volume of the settled blood portion (VSB), for example.

Furthermore, the quality check module 130 may be used to quantify geometry of the specimen container 102, i.e., quantify certain physical dimensional characteristics of the specimen container 102, such as the location of TC, HT, and/or W or Wi of the specimen container 102, and/or a color of and/or type of the cap 214.

Now referring to FIGS. 1, 4A, and 4B, a first embodiment of a quality check module 130 may include multiple image capture devices 440A-440C. Three image capture devices 440A-440C are shown and are preferred, but two or more or four or more can be used. Image capture devices 440A-440C may be any suitable device for capturing well-defined digital images, such as conventional digital cameras capable of capturing a pixelated image, charged coupled devices (CCD), an array of photodetectors, one or more CMOS sensors, or the like. For example, the three image capture devices 440A, 440B, 440C are illustrated in FIG. 4A and are configured to capture images from three different lateral viewpoints. For example, the image size may be about 2560×694 pixels, for example. In another embodiment, the image capture devices 440A, 440B, 440C may capture an image size that may be about 1280×387 pixels, for example. Other image sizes and pixel densities may be used.

Each image capture devices 440A, 440B, 440C may be configured and operable to capture lateral images of at least a portion of the specimen container 102, and at least a portion of the specimen 212. For example, the image capture devices 440A-440C may capture a part of the label 218 and part or all of the serum or plasma portion 212SP (even if partially or fully occluded by the labels 218). The image capture devices 440A-440C may also capture some or all of the cap 214 and some or all of the tube 215. Eventually, from the multiple images, a composite model of the specimen 212 in the specimen container 102 can be optionally developed. The composite model may be a 3D semantic model in some embodiments, and may be used to make final determinations about the specimen 212. In embodiments herein, the semantic data may be used to account for or compensate for the presence of labels 218 that may affect the transmitted light. It should be apparent that a semantic model is optional, and that the characterization may take place using only the image data obtained from the one or more viewpoints.

In the embodiment shown, the plurality of image capture devices 440A, 440B, 440C are arranged around the specimen 212 and configured to capture lateral images of the specimen container 102 and specimen 212 at an imaging location 432 from multiple viewpoints. The viewpoints may be spaced so that they are approximately equally spaced from one another, such as about 120 degrees from one another, as shown, when three image capture devices 440A, 440B, 440C are used. As depicted, the image capture devices 440A, 440B, 440C may be arranged around the track 121. Other arrangements of the plurality of image capture devices 440A, 440B, 440C may be used. In this way, the images of the specimen 212 in the specimen container 102 may be taken while the specimen container 102 is residing in the carrier 122. The field of view of the multiple images obtained by the image capture devices 440A, 440B, 440C may overlap slightly in a circumferential extent.

In one or more embodiments, the carriers 122 may be stopped at a pre-determined location in the quality check module 130, such as at the imaging location 432, i.e., at a point where normal vectors from each of the image capture devices 440A, 440B, 440C intersect each other. A gate or the linear motor of the carrier 122 may be provided to stop the carriers 122 at the imaging location 432, so that multiple quality images may be captured thereat. In an embodiment where there is a gate at the quality check module 130, one or more sensors (like sensors 116) may be used to determine the presence of a carrier 122 at the quality check module 130.

The image capture devices 440A, 440B, 440C may be provided in close proximity to and trained or focused to capture an image window at the imaging location 432, wherein the image window is an area including an expected location of the specimen container 102. Thus, the specimen container 102 may be stopped so that it is approximately located in a center of the view window. Within the images captured, one or more reference datum may be present. The reference datum may aid in quantification of the specimen 212. Reference datum may be TC or the bottom-most portion of the tube 215, or a mark placed in a known location somewhere on the specimen container 102 that can be viewed from at least one or all viewpoints, for example.

In operation, each image may be triggered and captured responsive to a triggering signal provided in communication lines 443A, 443B, 443C that may be sent by the computer 143. Each of the captured images may be processed according to one or more embodiments of the method provided herein. In one particularly effective method, high data rate (HDR) processing may be used to capture and process the images, although it should be understood that other imaging processing methods may be used.

In more detail, in accordance with one or more embodiments, multiple images are captured of the specimen 212 at the quality check module 130 at multiple different exposure times while being illuminated at one or more different spectra. For example, each image capture device 440A, 440B, 440C may take 4-8 images at different exposure times at each of the one or more spectra.

In one embodiment, the multiple spectral images may be accomplished using different light sources 444A-444C emitting different spectral illumination. The light sources 444A-444C may back light the specimen container 102 (as shown). A light diffuser may be used in conjunction with the light sources 444A-444C in some embodiments. The multiple different spectra light sources 444A-444C may be RGB light sources, such as LEDs emitting two or more different spectra, such as nominal wavelengths of 634 nm+/−35 nm (Red), 537 nm+/−35 nm (Green), and 455 nm+/−35 nm (Blue). In other embodiments, the light sources 444A-444C may emit one or more spectra having a nominal wavelength between about 700 nm and about 1200 nm. In other embodiments, the light sources 444A-444C may be white light sources. In cases where the label 218 obscures multiple viewpoints, IR backlighting or near IR backlighting may be used. In cases where multiple labels (See FIGS. 3D-3E) obscure the entire serum or plasma portion 212SP, the light sources 444A-444C may be IR or near IR light sources, as reasonable segmentation information may be generated on the serum or plasma portion 212SP even through the labels 218A-218C.

In the way of one non-limiting example, to capture images at a first wavelength, three red light sources (wavelength of about 634 nm+/−35 nm) may be used to illuminate the specimen 212 from three lateral locations. The red illumination by the light sources 444A-444C may occur as the multiple images (e.g., 4-8 images or more) at different exposure times are captured by each image capture device 440A-440C. In some embodiments, the exposure times may be between about 0.1 ms and 256 ms. Other exposure times may be used. In some embodiments, each of the respective images for each image capture device 440A-440C may be taken sequentially, for example.

In each embodiment, the quality check module 130 may include a housing 446 that may at least partially surround or cover the track 121 to minimize outside lighting influences. The specimen container 102 may be located inside the housing 446 during the image-taking sequences. Housing 446 may include one or more doors 446D to allow the carriers 122 to enter into and/or exit from the housing 446. In some embodiments, the ceiling may include an opening 446O to allow a specimen container 102 to be loaded into the carrier 122 by a robot including moveable robot fingers from above.

Once the red illuminated images are captured in the embodiment of FIGS. 4A-4B, another spectra of light, for example, green spectral light sources 444A-444C may be turned on (nominal wavelength of about 537 nm with a bandwidth of about +/−35 nm), and multiple images (e.g., 4-8 or more images) at different exposure times may be sequentially captured by each image capture device 440A, 440B, 440C. This may be repeated with blue spectral light sources 444A-444C (nominal wavelength of about 455 nm with a bandwidth of about +/−35 nm) for each image capture devices 440A, 440B, 440C. The different nominal wavelength spectral light sources 444A-444C may be accomplished by light panels including banks of different spectral light sources that can be selectively turned on and off, for example. Other means for backlighting may be used.

The multiple images taken at multiple exposure times for each respective wavelength spectra may be obtained in rapid succession, such that the entire collection of images for the specimen 212 from multiple viewpoints may be obtained in less than a few seconds, for example. In one example, 4 different exposure images for each wavelength at three viewpoints using the image capture devices 440A, 440B, 440C and back lighting with RGB light sources 444A-444C will result in 4 images×3 spectra×3 cameras=36 images. In another example, 4 different exposure images for each wavelength at three viewpoints using the image capture devices 440A, 440B, 440C and back lighting with R, G, B, W, IR, and NIR light sources 444A-444C will result in 4 images×6 spectra×3 cameras=72 images.

As part of a training process, reference images may be taken on labeled specimen containers 102 without any specimen 212 contained therein. The reference images may number in the thousands and may constitute examples of virtually all possible label configurations on the specimen container 102.

According to the characterization methods, the processing of the image data may involve, for example, selection of optimally-exposed pixels from the multiple captured images at the different exposure times at each wavelength spectrum and for each image capture device 440A-440C, so as to generate optimally-exposed image data for each spectrum and for each viewpoint. This is referred to as "image consolidation" herein. For each corresponding pixel (or superpixel/image patch), for each of the images from each image capture device 440A-440C, pixels (or superpixels/image patches) exhibiting optimal image intensity may be selected from each of the different exposure time images for each viewpoint. In one embodiment, optimal image intensity may be pixels (or superpixels/image patches) that fall within a predetermined range of intensities (e.g., between 180-254 on a scale of 0-255), for example. In another embodiment, optimal image intensity may be between 16-254 on a scale of 0-255), for example. If more than one pixel (or superpixel/image patch) in the corresponding locations of two images is determined to be optimally exposed, the higher of the two is selected. The selected pixels (or superpixels/image patches) exhibiting optimal image intensity may be normalized by their respective exposure times. The result is a plurality of normalized and consolidated spectral image data sets for the illumination spectra (e.g., R, G, B, white light, IR, and/or IR) for each image capture device 440A-440C where all of the pixels (or superpixels/image patches) are optimally exposed (e.g., one image data set per spectrum).

For each image data set including optimally-exposed pixels (or superpixels/image patches), a characterization process is undertaken to identify the pixels (or superpixels/image patches) that are classified as serum or plasma portion 212SP of the specimen 212. Additionally, the pixels (or superpixels/image patches) that are classified label 218 are also classified. Identifying the serum or plasma portion 212SP may be based on classifying each the pixels (or superpixels/image patches) in the optimally-exposed image data. Classification of the serum or plasma portion 212SP and the labels 218 constituting a label-containing region may be based upon operation of a multi-class classifier generated from multiple training sets. The multi-class classifier may comprise a support vector machine (SVM) or a random decision tree, for example. Other suitable programs or toolboxes may be used for segmentation by classifying the extent of the serum or plasma portion 212SP and the label-containing region 618.

According to embodiments, to carry out the classification, first statistical data, as described above, may be computed for each of the optimally-exposed pixels (or superpixels/image patches) at the different spectra (e.g., R, G, B, white light, IR, and/or near IR) for each image capture device 440A-440C. The statistical data may include mean values and covariance up to $2^{nd}$ order, for example. The calculated statistical attributes encode specific properties of object classes and are thus used for discrimination between the different object classes by assigning class labels. Once generated, the statistical data is presented to, and operated on, by a multi-class classifier 515, which may classify the pixels (or superpixels/image patches) in the image as belonging to one of a plurality of classes, such as 1-serum or plasma portion, 2-settled blood portion, 3-tube, 4-air, 5-cap, 6-label, 7-holder, and 8-gel separator (if used). From this, the pixels (or superpixels) making up the liquid region (i.e., the serum and plasma portion 212SP) and the label-containing region including labels 218 may be identified. The label containing region is a region identified as including a label 218, or multiple labels 218A, 218B, or multiple labels 218A, 218B, and 218C, for example.

The multi-class classifier 515 may be any suitable type of supervised classification model that is linear or non-linear. For example, the multi-class classifier 515 may be a support vector machine (SVM) that is either linear or kernel-based. Optionally, the multi-class classifier 515 may be a boosting classifier such as an adaptive boosting classifier (e.g., Ada-Boost, LogitBoost, or the like), any artificial neural network, a tree-based classifier (e.g., decision tree, random decision forests), and logistic regression as a classifier, or the like. A SVM may be particularly effective for classification between liquids and non-liquids, such as found in the analysis of the specimen 212. A SVM is a supervised learning model with associated learning algorithms that analyzes data and recognizes patterns. SVMs are used for classification and regression analysis.

Multiple sets of training examples are used to train the multi-class classifier 515, and then the image data set is operated on by the multi-class classifier 515 and each pixel (or superpixel) is classified. The multi-class classifier 515 may be trained by graphically outlining various regions in a multitude of examples of specimen containers 102 having various specimen conditions, various degrees of occlusion by label 218, occlusion by holder 122H, levels of serum or plasma portion 212SP and settled blood portions 212SB, and the like. As many as 500 or more images may be used for training the multi-class classifier 515. Each training image may be outlined manually to identify and teach the multi-class classifier 515 the areas that belong to each class.

A training algorithm builds the multi-class classifier 515 that assigns pixels (or superpixels/image patches) of any new specimens that are imaged into one of the classes. The SVM model represents examples as points in space that are mapped so that the examples of the separate classes are divided by a clear gap that is as wide as possible. New pixels from the image data set may be mapped into that same space and predicted to belong to a particular class based on which side of the gap they fall on. In some embodiments, SVMs can efficiently perform a non-linear classification using what is called a kernel trick (e.g., kernel-based SVM classifier), implicitly mapping their inputs into high-dimensional feature spaces. SVM and boosting are particularly preferred. Other types of classification models may be used.

From the pixel (or superpixel/image patch) identification of classes in 516, a semantic map can optionally be generated in 524. The semantic map may be a 3D map that may be stored in a database in the computer 143, and may consolidate all the classifications (e.g., 1-serum or plasma portion, 2-settled blood portion, 3-tube, 4-air, 5-cap, 6-label, 7-holder, and 8-gel separator (if used)) as a function of position (e.g., radial and axial position of the specimen container 102). The semantic map can be graphically displayed in some embodiments.

From the semantic map, a synthetic viewpoint can be chosen in 525. In one embodiment, the synthetic viewpoint may be one of the viewpoints (e.g., 1-3) from which the images were captured with the image capture devices 440A-440C. In another embodiment, the synthetic viewpoint may be another viewpoint (e.g., viewpoint 4 shown in FIG. 6D) that is in between any two of the multiple lateral viewpoints (e.g., viewpoints 1-3 shown in FIG. 6D) from which the images were captured with the image capture devices 440A-440C. The synthetic viewpoint is a viewpoint that includes the maximum number of pixels (or superpixels/image patches) that have been classified as serum or plasma portion 212SP. In the case where synthetic viewpoint is one of the viewpoints from which the images were captured with the image capture devices 440A-440C, the selected synthetic viewpoint may be chosen to be the viewpoint that exhibits the maximum number of pixels (or superpixels/image patches) that are classified at serum or plasma portion 212SP.

In some cases, two adjacent viewpoints may each include some pixels (or superpixels/image patches) located at adjacent image portions that are identified as serum or plasma portion 212SP. In this case, the synthetic viewpoint is selected to be between the two viewpoints including the image capture devices 440A-440C and the segmentation data for each viewpoint is consolidated to construct a synthetic viewpoint including the regions classified at serum or plasma portion 212SP from each respective viewpoint. In this way, the respective area reflecting serum or plasma portion 212SP in the synthetic viewpoint may be enlarged as compared to either of the individual viewpoints. Thus, better characterization of HILN may be carried out because of the larger amount of classified pixels (or superpixels/image patches), as will be apparent from the following.

Once the synthetic viewpoint has been selected in 525, front view data and back view data for the synthetic viewpoint may be identified in 526. The back view data is the classification and corresponding position data for the back view. The back view data may be data on the pixels (or superpixels/image patches) that have been classified during the segmentation in 511 as being either label 218 or serum or plasma portion 212SP.

Because the backlight from the light sources 444A-444C onto the backside of the specimen container 102 in each viewpoint may be blocked by the presence of the label 218 that are located on the backside, the intensities of the front view image captured by the image capture devices 440A-440C in front view regions corresponding to the back view regions containing the label 218 may be affected. As such, the intensities in those regions may be suspect (e.g., artificially low) and therefore should not be used directly as-is for the HILN detection, but should be appropriately adjusted and compensated for. Therefore, according to one or more embodiments of the disclosure, the characterization method takes into account the back view data.

Figure 6A:
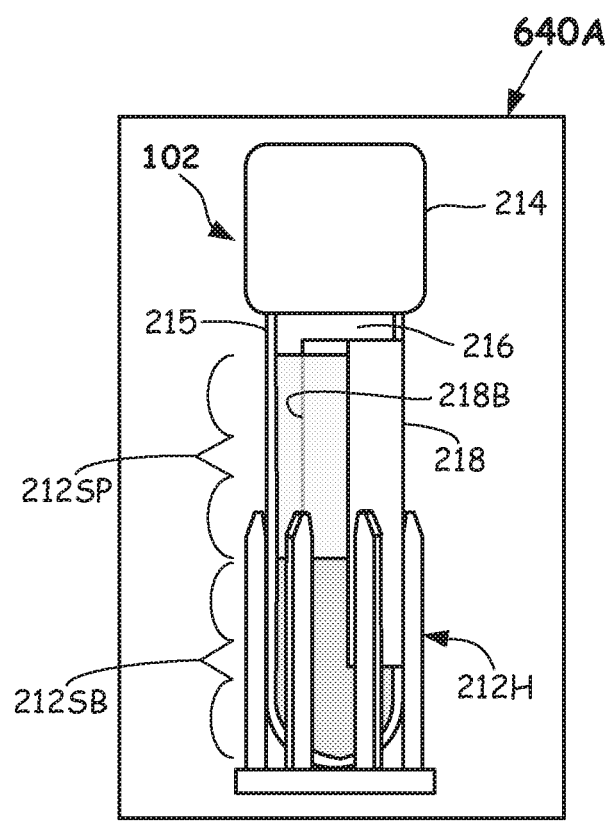
FIG. 6A illustrates a first segmented image from a first viewpoint of semantic map according to one or more embodiments.

Of course, due to the readings being suspect, one approach of taking into account the back view data might be to not using corresponding regions in the front view semantic data on regions that are classified as being label 218 in the back view semantic data when determining HILN by the HILN classifier 529. For example, FIG. 6A illustrates a front semantic image 640A from a first viewpoint 1 of image capture device 440A (FIG. 6D). As can be seen, some of the serum and plasma portion 212SP is shown in FIG. 6A, some is occluded by label 218, and some of the backlight emitted from light source 444A (FIG. 4A) is blocked by the back view label portion 218B (i.e., the portion of the label 218 that is located and occludes part of the backside view of the specimen container 102 in FIG. 6A). However, that may, in some instances, leave very little region classified as serum or plasma portion 212SP for analysis.

Figure 6B:
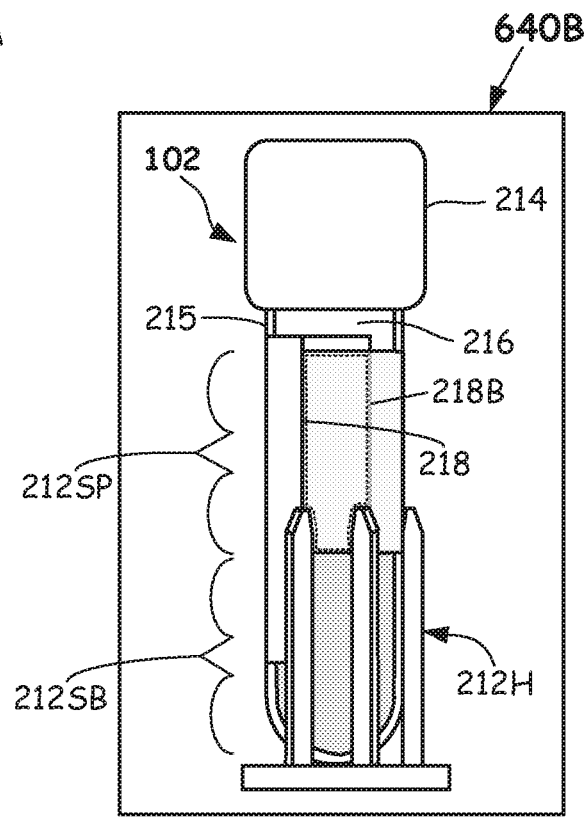
FIG. 6B illustrates a second segmented image from a second viewpoint from of a semantic map according to one or more embodiments.
Figure 6C:
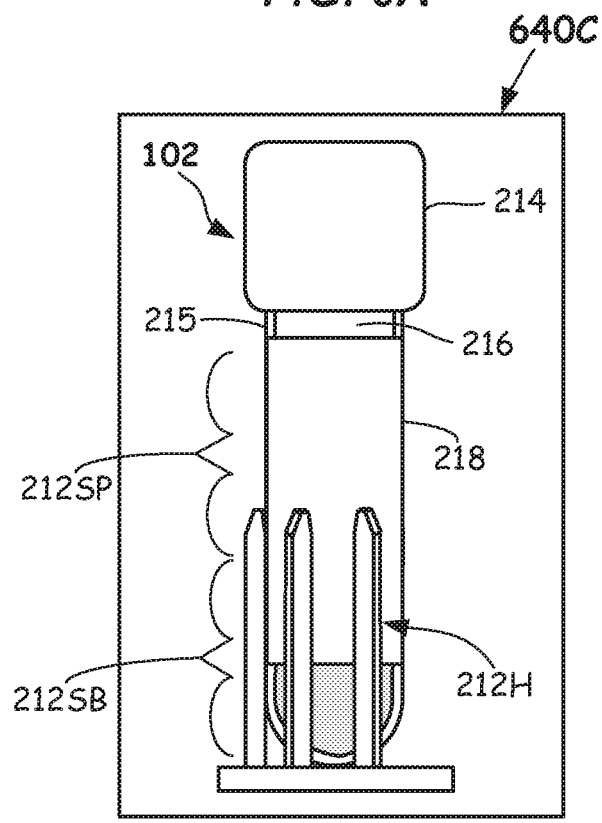
FIG. 6C illustrates a third segmented image from a third viewpoint from of a semantic map according to one or more embodiments.
Figure 6D:
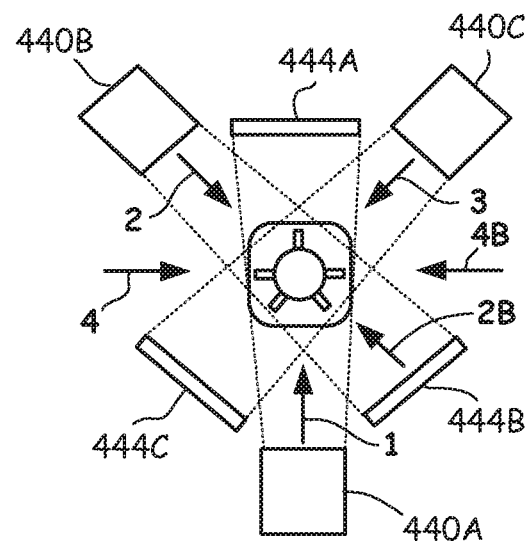
FIG. 6D illustrates a schematic top view illustrating various viewpoints of the quality check module according to one or more embodiments.

FIG. 6B illustrates a front semantic image 640B from a second viewpoint 2 of image capture device 440B (FIG. 6D). In FIG. 6B, some of the serum or plasma portion 212SP is occluded by label 218, and some of the backlight emitted from light source 444B (FIG. 6D) is blocked by the back view label portion 218B (i.e., the portion of the label 218 that is located on the backside of the specimen container 102 in FIG. 6B).

Figure 6E:
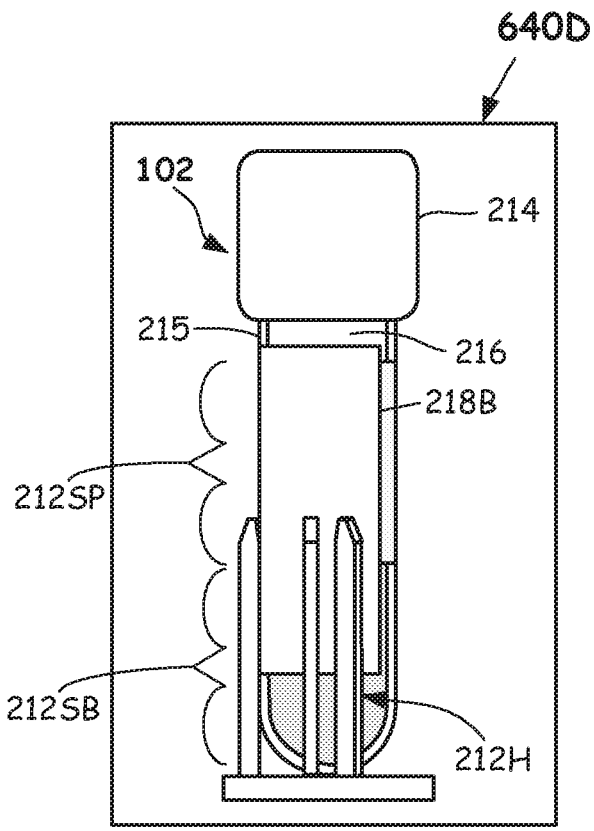
FIG. 6E illustrates a semantic back view from a synthetic viewpoint according to one or more embodiments.

FIG. 6C illustrates a front semantic image 640C from viewpoint 3 of image capture device 440C (FIG. 6D). In FIG. 6C, all of the serum or plasma portion 212SP is occluded by label 218 from viewpoint 3. Thus, if the characterization method choses the synthetic viewpoint in 525 to be one of these three viewpoints (1, 2, or 3), then the second viewpoint 2 of FIG. 6B would be chosen. This is because the viewpoint, as illustrated in FIG. 6B, has the most pixels (or superpixels/image patches) that have been classified as serum or plasma portion 212SP, which may be determined from the semantic map generated in 524 or from the semantic data from the individual images. In this case, the corresponding region in the front semantic image 640B of the serum or plasma portion 212SP that has been blocked by the label (the region shown as dotted), may be intensity adjusted by the characterization method as will be described below. This synthetic viewpoint is determined by constructing a back view semantic map or image data, which may include intensity data, classification data, and positional data collected and consolidated from all three views (1, 2, and 3). In other words, the back view data is taken into account, i.e., the knowledge of the location of the label 218 is known and used to modify the corresponding regions of the second semantic front view 2. A hypothetical back view semantic map 640D from viewpoint 2B is shown in FIG. 6E. This represents back view data from a viewpoint 2B (FIG. 6D) that is used to intensity adjust the dotted portion in the front view semantic image from viewpoint 2 (FIG. 6B). In practice, there may be no semantic back view map (like FIG. 6E), but just back view semantic data that is used in the characterization method.

Figure 6F:
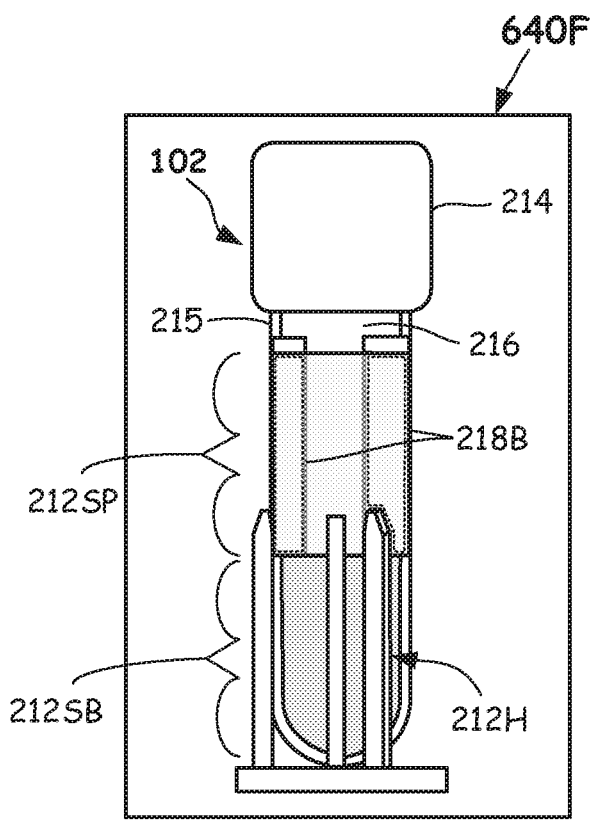
FIG. 6F illustrates a semantic front view from a synthetic viewpoint according to one or more embodiments.

In the case where the synthetic viewpoint selected in 525 is other than one of the multiple viewpoints (1-3), then a viewpoint that is a compilation of two of the other viewpoints may be selected. For example, given viewpoint 3 in FIG. 6C has the serum or plasma portion 212SP totally occluded by label 218, a viewpoint may be selected that is between viewpoints 1 and 2. This synthetic viewpoint 4 shown in FIG. 6F is a synthetic front view. This is a compilation of viewpoint 1 and viewpoint 2 and thus has approximately twice the number of pixels (as shown) that are classified as serum or plasma portion 212SP, i.e., more region that is classified as serum or plasma portion 212SP is available for analysis. As before, in one approach, the data associated with the corresponding back view label portions 218B (shown as dotted in FIG. 6F) from the synthetic back view 4B can be intensity adjusted according to the characterization method. In this case, the data corresponding to the remaining region classified as serum or plasma portion 212SP (between the two dotted regions) and a combined representation of the dotted region can be fed into the HILN classifier 521.

According to embodiments of the characterization method, feature descriptors may be provided as a combined representation from a label characterization 517. For example, the generation of the combined representation may include information from the segmentation 511 on the label-containing region 618 and also information extracted from the reference label configuration database 522. The reference label configuration database 522 includes data on hundreds or even thousands of images taken during a training phase on numerous specimen containers 102 including different label configurations wherein the specimen container 102 did not include a specimen therein (i.e., it was empty). The training phase may be accomplished in the quality check module 130 prior to any pre-screening and may provide multiple images including different orientations (rotational) while held in the holder 122H for each size of specimen container 102 and each different label configuration.

For example, some reference images may include a small specimen container 102 (e.g., 13 mm×75 mm) having a single label 218. Training may be accomplished on many reference examples including small/single label orientations. Others training examples may include multiple labels 218A, 218B and/or 218A-218C and different tube sizes. The configurations may be provided with different numbers of labels, degrees of overlap, and positioning. The label data may be appropriately indexed within the reference label configuration database 522 in order to improve the speed of access to the rather large amount of label configuration data.

Figure 6G:
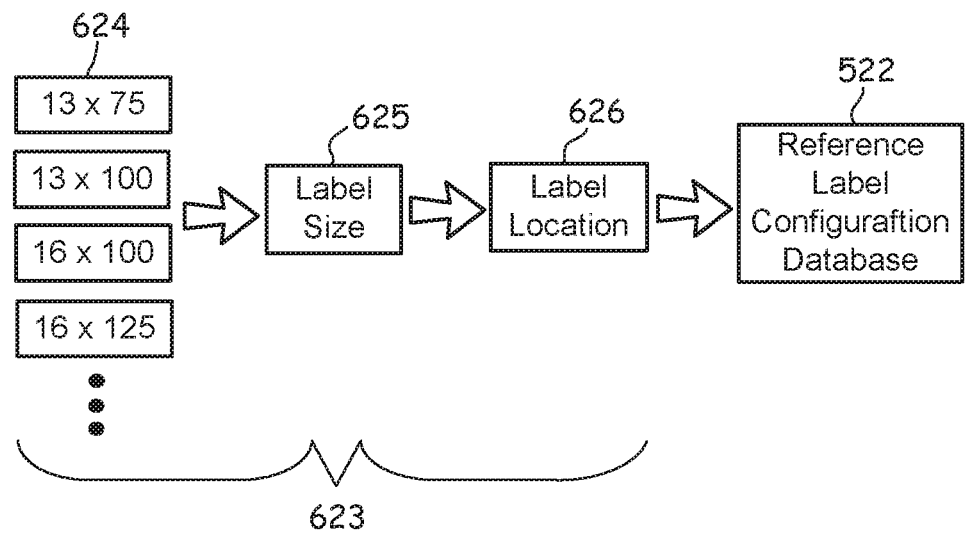
FIG. 6G illustrates an example indexing scheme of a reference label configuration database according to one or more embodiments.
Figure 6H:
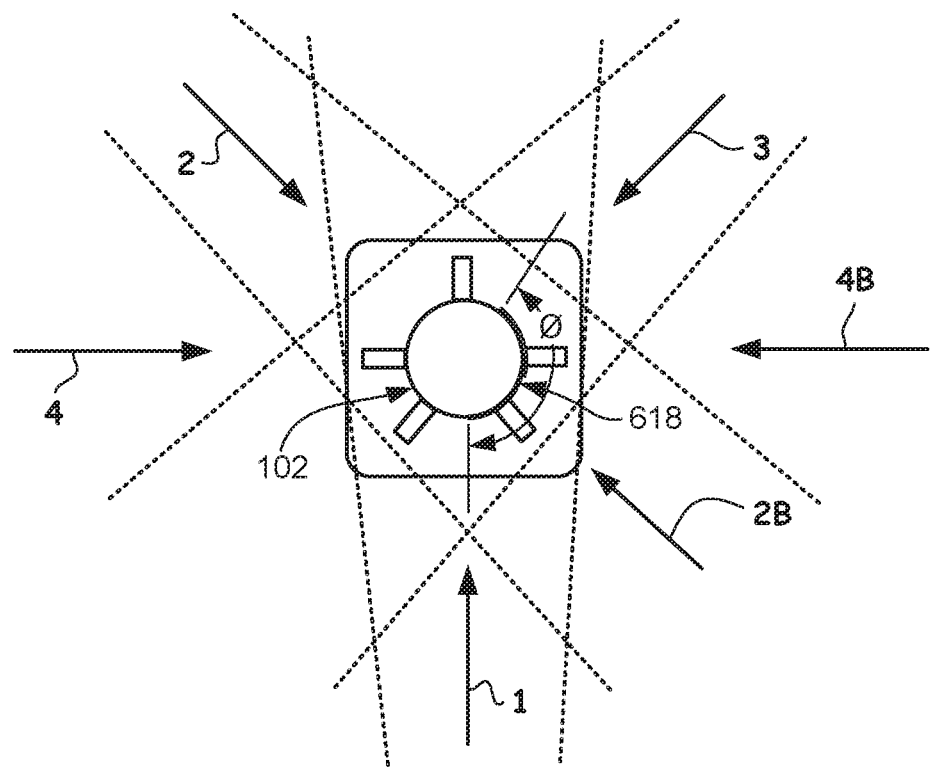
FIG. 6H illustrates a downward-looking view a specimen container including a label-containing region and showing an example label orientation relative to various viewpoints according to one or more embodiments.

The indices may include two or more index features 623, such as tube size 624, label size 625, and/or label location 626, for example, as shown in FIG. 6G. However, more or different index features may be used. The tube size 624 of the specimen container 102 may be input into the reference label configuration database 522 as part of the training process and is correlated to W and HT (FIG. 2A), which may also be characterized during training. Optionally, the tube size 624 may be input manually during the training process. The label size 625 may be provided in the reference label configuration database 522, and may be characterized in one embodiment as an arc angle φ quantifying a radial span measured in a horizontal plane of the label-containing region 618 as shown in FIG. 6H. The label-containing region 618 may comprise one label 218 or multiple (2, 3, or more) overlapping labels. In the depicted embodiment, two overlapping labels are shown. For example, the label size 625 may be input into the reference label configuration database 522 as arc angle φ that equals about 150 degrees in the depicted example, either manually or as part of a segmentation process taking place during training. Other indexes of label size 625 may be used, such as measured length measured around the girth of the specimen container 102.

Label location 626 as an index may be entered into the reference label configuration database 522 as which one or more viewpoints (e.g., viewpoints 1-3) contain a label-containing region 618. For example, in the depicted embodiment, image data from viewpoints 1, 2, and 3 all include pixels that may have been characterized as label. Data on label location 626 of the numerous training examples may be entered manually or as part of a segmentation process taking place during training. A single label may be provided only in one viewpoint or possibly in two. Other indexes of label location 626 may be used. Moreover, more indexes may be used to improve access to the data in the reference label configuration database 522.

Figure 5:
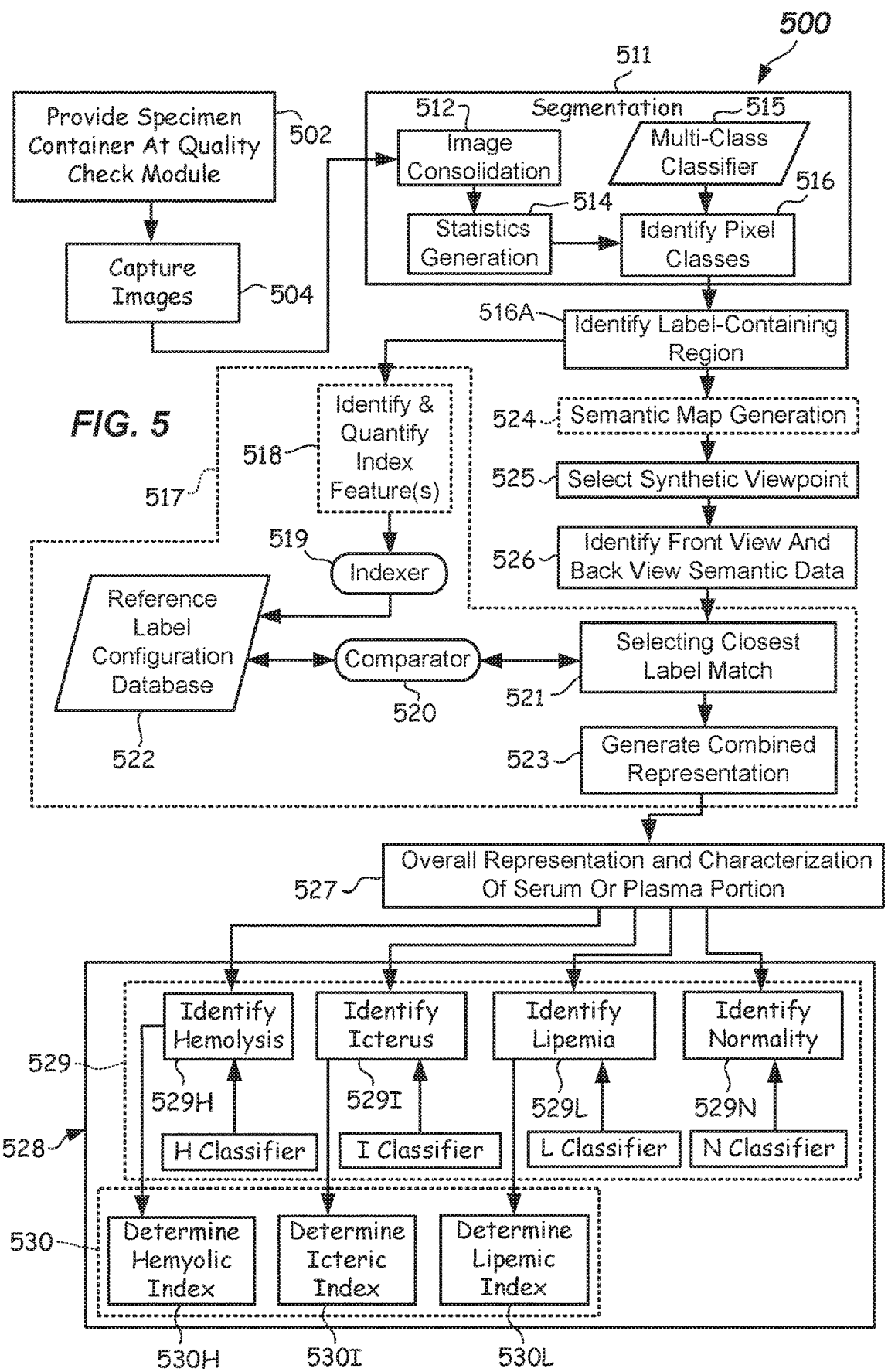
FIG. 5 illustrates a block diagram of functional components of a quality check module configured to characterize the specimen, and which may be used determine a presence of H, I, and/or L or N in a specimen according to one or more embodiments.

As shown in FIG. 5, during pre-screening, a particular specimen container 102 and specimen 212 are provided at the quality check module 130 in 502 in a certain rotational orientation and including a certain label configuration. The images of the specimen container 102 and specimen 212 are captured in 504 and segmented in segmentation 511. From the identified pixel classes in 516, the label-containing region 618 can be identified in 516A. The label-containing region 618 may be all encompassed within one viewpoint or may be identified in multiple viewpoints, or even in all three viewpoints, for example. Moreover, from the results of segmentation 511, one or more index features may be characterized (identified and quantified) in 518. The index features may include tube size, label size, and label location, as previously discussed, for example. However, other or more or less indexing features may be used. Each of these index features may be quantified by finding the difference between the pixel locations of the respective edges of the tube 215 and label 218 in the image data comprising tube 215 and label 218. Once the indexing features are identified and quantified in 518, then the label sub-data belonging to the various chosen index(es) may be identified within the reference label configuration database 522 by an indexer 519.

The indexer 519 operates to focus the search of the indexed label sub-data within the reference label configuration database 522. This mass of label sub-data stored in the reference label configuration database 522 may be compared by using a comparator 520 to the image data on label-containing region 618 that was previously identified in 516A. Comparator 520 may be any suitable program or scheme that compares image data. This comparison by comparator 520 results in identification and selection of a single reference label configuration from the multiple reference label configurations stored in the reference label configuration database 522. The selected single reference label configuration is a closest label match in 521 to the label-containing region 618 that was identified in 516A. To further reduce computational burden, in some embodiments, determining a closest label match in 521 may comprise down scaling of the segmentation data of the label-containing region 618 to match a relative scale (e.g., pixel density) of the reference label configuration database 522.

The comparator 520 may employ any suitable algorithm to quickly compare the label-containing region 618 to the label sub-data on the mass of label region configurations stored in the reference label configuration database 522. The comparator 520 may compare pixel-by-pixel or patch-by-patch and may include suitable weighting and/or rectifying features to aid in detection of similarities. Moreover, certain corner-finding or blob-finding algorithms may be used.

In some embodiments, a semantic map may be generated in 524, which may be a 3D representation of the data from the various viewpoints collected together. This data may be graphically displayed or otherwise used to improve the segmentation between the various viewpoints (e.g., viewpoints 1-3). In 525, a synthetic viewpoint may be selected, which may be one of the three viewpoints 1-3, or optionally one that is in between any two of the viewpoints 1-3. The synthetic viewpoint is a viewpoint (e.g., viewpoint 4 of FIG. 6F) that has the most area (most number of pixels or superpixels/patches) that have been characterized by the segmentation 511 as being serum or plasma portion 212SP.

From this, the front and back views along the synthetic viewpoint may be identified and, in 526, the front and back view semantic data associated therewith may be identified. The front view data is the data associated with the side of the specimen container 102 that is closest to the respective image capture device 440A-440C, whereas the back view data is the data associated with the side of the specimen container 102 that is closest to the respective light source 444A-444C.

Once the closest label match is found in 521, then the method 500 carries out generating a combined representation in 523. The combined representation is guided by the segmentation information of the label-containing region 618 and the data on the closest label match. The generation of the combined representation involves generation of pixel-by-pixel feature descriptors (corresponding to occluding label regions that are, as the case may be, either in front of or in back of a serum or plasma portion 212SP, or both). Generating a combined representation may comprise calculating, on a pixel by pixel basis (or super pixel by superpixel), a difference between, a ratio between, or a concatenation of, the label-containing region 618 to the reference label configuration selected from the multiple reference label configurations. The evaluation of the combined representation on the label-containing regions (front and/or back views) together with the evaluated/classified feature representations of the serum or plasma portion 212SP where no label 218 occludes the front view or back view are used in the characterization method and for final HILN determination. These representations are supplied to the interferent characterizer 528 as an overall representation of the serum or plasma portion in 527 (both occluded and un-occluded portions (if any).

In the representation generation any regions including barcode may be ignored. The barcode data regions and their locations may be readily determined based upon the segmentation 511 and/or a suitable barcode reading algorithm. Of course, the barcode data may be used for identification of the specimen 212, as discussed above.

The interferent characterizer 528 includes HILN classifier 529 which may be configured to identify whether H, I, and/or L is present within the serum or plasma portion or whether no HIL is present within the serum or plasma portion 212SP and is thus normal (N). The interferent characterizer 528 may further include an interferent index generator 530 as discussed below. Therefore, effectively, the interferent classifier (e.g., HILN classifier 529), operates to classify, based on the semantic data and the supplied feature representations, whether an interferent is present within the serum or plasma portion 212SP, or is absent therefrom. Additionally, the interferent characterizer 528 may determine an index for any interferent (H, I, and/or L) that is detected. In one or more embodiments, the HILN classifier 529 may be embodied as one or more different interferent type classifiers, such as a hemolysis classifier 529H configured and adapted to identify hemolysis, an icterus classifier 529I configured and adapted to identify icterus, a lipemia classifier 529L configured and adapted to identify lipemia, and a normality classifier 529N configured and adapted to identify normality. Each classifier may be a binary classification model. The result of operating on the semantic data is the presence of one or more interferent (H, I, and/or L) or the absence of an interferent (N) in the serum or plasma portion 212SP.

Hemolysis Detection

According to another broad aspect, embodiments of the disclosure are directed at a method and apparatus that may be used to detect if the specimen 212 contained in a specimen container 102 of centrifuged blood is hemolyzed.

The method utilizes the multiple image capture devices 440A-440C at multiple viewpoints, and may utilize multiple exposures (e.g., 4-8 exposures or more) and multiple spectral illumination (e.g., R, G, B, white light, IR, or near IR) to capture multiple pixelated spectral images. Images associated with the viewpoints are then analyzed and operated on to provide segmentation and identify the serum or plasma portion 212SP as discussed above and the label-containing region 618 in 516A and a combined representation of the label-containing region is generated in 523. This combined representation is obtained from using the semantic data and the reference label data from reference label configuration database 522 of a closest label configuration match to the label-containing region 618 identified by segmentation. This data is further operated on at 529H by a HILN classifier 529 to identify hemolysis, based upon the classifier model being previously trained with a multitude of hemolyzed specimens of different hemolytic indices.

The extent or degree of hemolysis may be characterized by a hemolytic index as determined at 530H of interferent index generator 530. "Hemolytic index" as used herein means a grade given to a particular specimen 212 based upon the determined content of hemolysis present in the serum or plasma portion 212SP. The grading scale for observation ranges may range from a minimum measure to a maximum measure. For example, the measures may be discreet measures from zero through some finite value (e.g., 0-4), where zero represents substantially no hemolysis and four represents significant hemolysis. Alternately, a grading scale of 0-10, 0-20, A-F, or some other range could be used. A specimen 212 having a sufficiently high hemolytic index (e.g., above a pre-determined H threshold) as determined by the quality check module 130, may be rejected. A usual procedure is to redraw another specimen 212 from the patient to ensure that a specimen 212 of good quality may be presented to the analyzer 106, 108, and/or 110 (FIG. 1). Thus, the specimen 212 exhibiting a relatively-high hemolysis index may, after the pre-screening at quality check module 130, be rejected and offloaded at loading area 105 without being further tested. Optionally, the specimen 212 may be re-tested at the quality check module 130 or at another station. In any event, depending on the test ordered, the hemolysis index may be reported along with the test results from the one or more analyzers 106, 108, and/or 110. If the specimen 212 is found to contain a sufficiently-high index level of hemolysis at 530H, an alert may be displayed on a display (e.g., computer screen) of the computer 143 or CIM 145 of the specimen testing apparatus 100 to alert lab personnel so that they may order further evaluation, order a specimen redraw, and/or make further decisions when the specimen 212 is found to contain a possibly interfering amount of hemolysis.

To improve an ability to convey the assessment of a specimen 212 containing hemolysis to laboratory personnel, an image of the specimen container 102 including the specimen 212 having hemolysis may be displayed on a display of the computer 143 or of the CIM 145. This image may be displayed along with other collaborative information such as, but not limited to, reference images of various known hemolyzed specimens, color spectra for comparison, the assessed index level of hemolysis of the specimen 212, and/or suggested action for the laboratory personnel to take.

Icterus Detection

According to another broad aspect of the method, embodiments of the disclosure are directed at a method and apparatus that may be used to detect icterus in a serum or plasma portion 212SP contained in a specimen container 102 of centrifuged blood. An icterus interferent may arise, for example, from an excess of bilirubin resulting from decaying red blood cells being converted into bilirubin in the spleen. Levels of bilirubin above 2-3 mg/dl are visibly dark yellowish or brownish in color and may adversely affect any enzyme-based immunoassays carried out on the analyzers (e.g., analyzers 106, 108, and/or 110). Such a condition is also termed bilirubinaemia.

The icterus detection method is similar to that for detecting hemolysis. After image capture and performing an analysis of the pixelated images to provide segmentation in 511, the data including the improved feature characterizations, which has taken into account the occlusion by label may be analyzed for the presence of icterus. According to the method, the same data that was operated on for the hemolysis detection may be supplied to the identify icterus with an icterus classifier at 529I. The analysis may use a properly-trained binary classifier to determine if icterus is present. As before for hemolysis detection, if icterus is detected the interferent level detector 529I may determine an interferent level, such as an icteric index. "Icteric index" as used herein means the grade given to a particular specimen 212 based upon the determined content of icterus that is present. The grading scale for observation may range from a minimum to a maximum measure, such as from zero through a maximum measure (e.g., 0-4). Zero represents substantially no icterus, while four represents significant presence of icterus. Alternately, other grading scales could be used, such as 0-10, 0-20, A-F, or some other range.

Lipemia Detection

According to another broad aspect, embodiments of the disclosure are directed at a method and apparatus that may be used to detect lipemia in a specimen 212 contained in a specimen container 102 of centrifuged blood. A lipemia interferent, which may exhibit a whitish appearance in the serum or plasma portion 212SP, may arise from the presence of excess lipids in the blood. Lipid levels above about 50 mg/dl may interfere with antibody binding in immunoassay testing and may therefore affect an immunoassay result from the analyzer 106, 108, or 110.

The lipemia detection method is similar to that for detecting hemolysis and icterus. The method may receive the specimen container 102 at the quality check module 130. Next, image capture devices 440A-440C may capture pixelated images of the specimen 212 from multiple viewpoints. The computer 143 may then perform an analysis of the images as described above to segment the specimen container 102 and specimen 212 in 511. From the segmentation and the label match operation discussed above, data including a combined representation may be operated on to determine the presence of lipemia using a lipemia classifier at 529I. According to the method, the same semantic data that was used for the hemolysis and icterus detection may be operated on to determine the presence of lipemia. The analysis may determine if a lipemia interferent is present by using a trained L classifier model to identify lipemia at 529L. Any suitable classifier may be used, such as a SVM.

If Lipemia (L) is identified at 529I, then an interferent level, such as a lipemic index may be determined at 526L. Lipemic index is grade given to a serum or plasma portion 212SP based upon the determined content of lipemia therein. The grading scale may range from a minimum to a maximum value (e.g., zero through four (0-4)). Zero represents substantially no lipemia, while four represents significant presence of lipemia. Alternately, other grading scales could be used, such as 0-10, 0-20, A-F, or some other range. Other grading scales may be used. Lipemia is a specific sample quality discoloration defect, which may be resolved with special processing. Thus, once identified at a quality check module 130, and before the specimen 212 is tested or analyzed on an analyzer (e.g., analyzer 106, 108, 110), the specimen 212 may be sent to another location (e.g., to remote station 132) for further processing.

The further processing the specimen 212 may involve one or more operations to remove or reduce an amount of lipid in the serum or plasma portion 212SP. For example, the processing may introduce a solvent or other material to reduce the amount of lipemia. Following the additional processing to lower the lipemia level (i.e., to lower the lipemic index), the specimen 212 can be returned to the track 121 and may be placed directly on an analyzer (e.g., analyzer 106, 108, 110) for analysis. Optionally, the specimen 212 may again be routed to the quality check module 130 so to rescreen the specimen for lipemia in accordance with the method disclosed herein. If the lipemia index is now sufficiently low, and determined to be normal (N), then the specimen may be routed on track 121 directly to be analyzed on the one or more analyzer (e.g., analyzer 106, 108, or 110). Thereafter, the specimen 212 may be returned to the loading area 105 for offloading from the track 121.

Normality Detection

In accordance with a one aspect, the specimen 212 may first be processed to determine if the serum or plasma portion 212SP may be identified as being normal (N), i.e., lacking any indication of H, I, and L, by quality check module 130 via normality classifier at 529N. In some cases, the method 500 may forego analysis for H, I, and L if the serum and plasma portion 212SP is identified as being normal (N) at 529N. Accordingly, if N, then the specimen 212 it may be successfully analyzed at the one or more analyzers (e.g., analyzers 106, 108, and/or 110) without confidence that there is no interferent contained therein.

As before, the identification of N involves the previous capture of the pixelated images of the specimen 212 from multiple viewpoints, segmentation in 511, and providing improved characterization of the label-containing region 618 in label characterization 517. According to the method 500, the same data set that was described for use for the previously-described H, I, and L detection may be operated on to determine N. A trained normality classifier may be used to determine normality in 529N. Any suitable classifier may be used, such as a SVM.

Thus, embodiments of the disclosure may detect H, I, and/or L, or N at the first possible instance after centrifugation of the specimen 212. By detecting H, I, and/or L or N at this point in the process, the specimen 212 will not be wasted, erroneous test results may be prevented, valuable analyzer time may not be wasted, and any patient test result delay will be minimized.

In some embodiments, to provide an even more accurate measurement of the level of H, I, and/or L present in the serum or plasma portion 212SP, an artifact detection method may be employed to identify a presence of an artifact, such as clot, bubble, or foam in the serum or plasma portion 212SP. The pixels identified as containing one or more artifacts in the serum or plasma portion 212SP may be ignored in the data for the synthetic viewpoint and not used in the HILN classifier 529. The artifact detection method is further described in U.S. Provisional Patent Application 62/288,358 filed Jan. 28, 2016, and entitled "Methods And Apparatus For Classifying An Artifact In A Specimen."

According to the method 500, identifying hemolysis in 529H, identifying icterus in 529I, identifying lipemia in 529L, and identifying normality in 529N may be carried out by operating of the inputted data with a HILN classifier 529 that is trained based upon multiple training sets. In one embodiment, individual binary classifiers may be used for each of H, I, L, and N. Optionally, a multi-class classifier may be used for identifying any one or more of H, I, L, or N. The multi-class classifier (e.g., a four class classification model) may be a support vector machine (SVM), support-vector network, or a boosting class algorithm. Examples of support vector machines and networks are described in a paper entitled "Support-vector Networks" by C. Cortes and V. Vapnik in Machine Learning Vol. 20, Issue 3, page 273-297, in a paper entitled "Additive Logistic Regression: A Statistical View of Boosting" by J. Friedman, T. Hastie, R. Tibshirani (1998), and "A Short Introduction to Boosting" by Y. Freund and R. E. Schapire (1999).

A determination that the serum or plasma portion 212SP is, as a whole, characterized as including H, I, and/or L, or N may be accomplished by adding a number of pixels (or superpixels/image patches) in the serum or plasma portion 212SP that have been classified by the HILN classifier 529 as being N, H, I, or L. The classification as normal (N) or as containing an interferent may be based upon a largest number of pixels (or superpixels/image patches) in each class, or a suitable weighting scheme in some embodiments.

Thus, in one embodiment, if a majority of pixels (or superpixels/image patches) are classified as N, then the serum or plasma portion 212SP may be categorized as normal (N). If a majority of pixels (or superpixels/image patches) are classified as H, then the serum or plasma portion 212SP may be categorized as containing hemolysis (H). Likewise, if a majority of pixels (or superpixels/image patches) are classified as I or L, then the serum or plasma portion 212SP may be categorized as Icterus (I), or lipemia (L), respectively. In other embodiments, a weighted majority voting scheme may be also used to classify the specimen 212 using probabilities from the HILN classifier 529 as a weight. Other means for characterizing the serum or plasma portion 212SP, as a whole, may be used.

Moreover, if the data set contains a relatively large amount of pixels (or superpixels/image patches) that are classified in two or more interferent classes (e.g., H and I, H and L, I and L, or even H, I, and L), then the interferent detection method may report that multiple interferent types are present. Once the specimen 212 has been given a characterization as containing multiple interferent types (e.g., H, I, and/or L), the interferent level detector 530 may be used to provide an interferent level for the multiple interferent types in the serum or plasma portion 212SP. Interferent level detector 530 may obtain an interferent index for each particular interferent by passing the data set through a level characterizing model, such as a supervised regression model. Any suitable regression model may be used, such as support vector regression (SVR), neural network regression, tree-based regression, or the like.

A different regression model may be used for each interferent type, such as hemolysis regression model 530H, icterus regression model 530I, and lipemia regression model 530L. In one or more embodiments, each of the regression models may be an SVR machine and may be trained using a liquid region that exhibits that particular type of interferent type (e.g., H, I, or L). For example, the hemolysis regression model 530H may be trained with a broad range of specimens 212 having hemolysis levels across a diverse range of expected hemolysis levels. Likewise, the icterus regression model 530I may be trained with a broad range of specimens 212 having icterus levels across a diverse range of expected levels. Similarly, lipemia regression model 530L may be trained with a broad range of specimens 212 having lipemia levels across a diverse range of expected levels. In some embodiments, the interferent levels may be discretized. For example, four discreet levels may be used. More or less than four discreet levels may be used. If the interference levels of the models have been discretized, then the output from the regression models may also be discretized by mapping to the closest target level. In any event, according to one or more embodiments, an interferent index may be provided for each detected interferent type.

Accordingly, it should be apparent that the methods carried out by the quality check module 130 may result in a rapid characterization of the specimen 212 as being either normal N or as containing one or more interferent HIL therein. If the specimen 212 contains one or more interferent, then the method may further determine the interferent type or types present, and may also determine an interferent index for each interferent type present.

Figure 7:
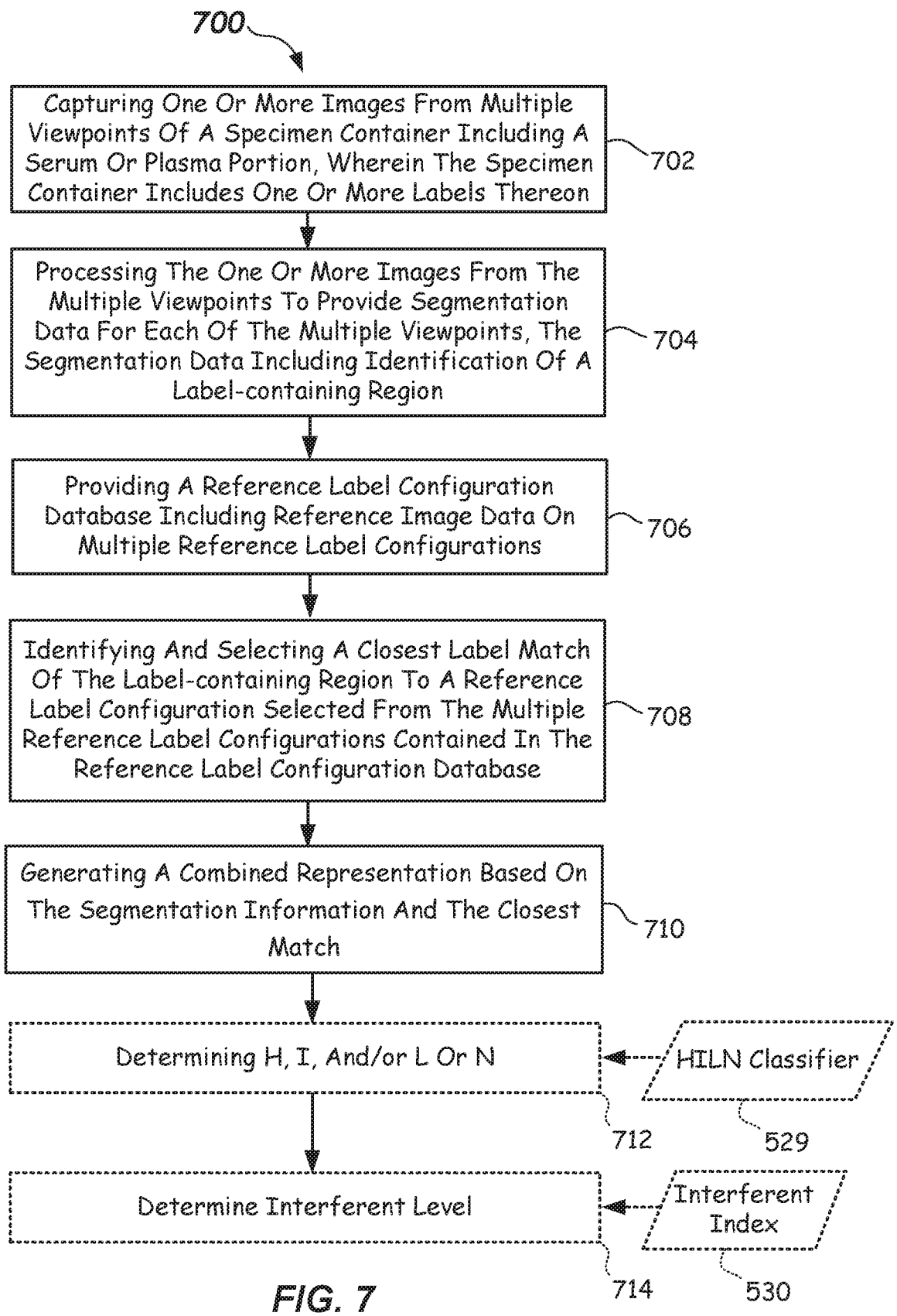
FIG. 7 is flowchart of a characterizing method according to one or more embodiments.

FIG. 7 illustrates a flowchart of a characterization method 700. The characterization method 700 may be carried out with a quality check module as described herein. In particular, the characterizing method may be a part of a method of determining an interferent in a specimen 212 according to one or more embodiments. The characterization method 700 includes, in 702, capturing one or more images from multiple viewpoints (e.g., viewpoints 1, 2 and 3) of a specimen container (e.g., specimen container 102) including a serum or plasma portion (e.g., serum or plasma portion 212SP) of a specimen (e.g., specimen 212), wherein the specimen container includes one or more labels (e.g., label 218, 218A, 218B, 218C) thereon. The one or more images may be digital, pixelated images captured using one or more image capture devices (e.g., image capture devices 440A-440C).

The characterization method 700 further includes, in 704, processing the one or more images from the multiple viewpoints to provide segmentation data for each of the multiple viewpoints, the segmentation data including identification of a label-containing region (e.g., label-containing region 618). The multiple images may include multiple images at each viewpoint at different exposure times and/or at different spectra (e.g., R, G, B, white light, IR, and/or near IR). For example, there may be 4-8 different exposures or more taken at different exposure times in some embodiments, but under the same lighting conditions. In one or more embodiments, some images may be captured using white light as the backlighting light source 444A-444C and some may be captured using a plurality of single-wavelength peak, narrow-band spectral light sources, such as red, blue and green as backlit light sources 444A-444C. Optionally, IR or near IR light sources may be used as backlighting sources.

The segmentation data may be obtained using HDR imaging as described herein and segmentation (e.g., segmentation 511) may be accomplished by a suitable model-based method, such as the classification method described herein wherein the image data is segmented in various classes, such as 1-serum or plasma portion, 2-settled blood portion, 3-tube, 4-air, 5-cap, 5-label, 6-holder, and 7-gel separator (if used). In particular, the label-containing region 618 containing the label(s) is identified in the segmentation 511 is used by the characterization method 700.

In particular, the characterization method includes, in 706, providing a reference label configuration database (e.g., reference label configuration database 522) including reference image data on multiple reference label configurations. The multiple reference label configurations are obtained on hundreds or even thousands of configurations of labels provided on the specimen container as part of a training process. The multiple reference label configurations may be obtained in the quality check module 130, but with no specimen in the specimen container 102. The label configurations may include configurations with one label 218 or multiple labels (e.g., two labels 218A, 218B), three labels (218A, 218B, 218C) provided on the specimen container 102, such as adhered labels 218, for example. The label configurations may include various levels of label overlap. Some embodiments may occlude and entire viewpoint, or even more than one viewpoint. Some embodiments may be entirely covered with labels 218A, 218B, 218C so as to occlude all viewpoints.

The characterization method 700, includes, in 708, identifying and selecting a closest label match (e.g., selecting a closest label match 521) of the label-containing region (e.g., label-containing region 618) to a reference label configuration selected from the multiple reference label configurations contained in the reference label configuration database (e.g., reference label configuration database 522). Any suitable method for comparing may be used to fine the closest label match. Indexing may be used to reduce the amount of data to search through during the comparison, by indexing the reference label configuration database 522 with indexing features, such as tube size, label size, label location, for example. Other indexes may be used.

The characterization method 700 includes, in 710, generating a combined representation based on the segmentation information on the label containing region (e.g., label-containing region 618) and the closest label match.

The combined representation may then be fed to a HILN classifier (e.g., HILN classifier 529) along with semantic data on the serum or plasma portion (e.g., serum or plasma portion 212SP). The characterization method 700 includes, in 712, determining HILN of the serum or plasma portion 212SP. The HILN determination is based on front view semantic data processed with the HILN classifier 529, while taking into account the portions of the serum or plasma portions 212SP that are occluded by the label-containing region 618.

Optionally, in 714, an interferent level (e.g., H, I, and/or L index) may be detected, such as by using an interferent index model such as a regression model or the like. Accordingly, based on the foregoing it should be apparent that an improved characterization method 700 is provided that better characterizes the serum or plasma portion 212SP by adjusting the image data to account for labels that may occlude the one or more viewpoints. The improved characterization may be used to provide a rapid and robust characterization of a presence of H, I, and/or L, or N of the specimen 212, and if an interferent (e.g., H, I, and/or L) is detected, an interferent level may be assessed and reported.

As should be apparent, the above characterization methods may be carried out using a quality check module (e.g., quality check module 130), comprising a plurality of image capture devices (e.g., image capture devices) 440A-440C arranged around an imaging location (e.g., imaging location 432), and configured to capture multiple images from multiple viewpoints (e.g., multiple viewpoints 1-3) of a specimen container 102 including one or more labels 218, 218A-218B, or 218A-218C and containing a serum or plasma portion 212SP of a specimen 212, and a computer (e.g., computer 143) coupled to the plurality of image capture devices and adapted to process image data of the multiple images. The computer (e.g., computer 143) may be configured and capable of being operated to process the multiple images from the multiple viewpoints (e.g., viewpoints 1-3) to provide segmentation data for each of the multiple viewpoints, the segmentation data including identification of a label-containing region (e.g., label-containing region 618 including one or more labels 218), store in memory a reference label configuration database (e.g., reference label configuration database 522) including reference image data on multiple reference label configurations, determine a closest label match of the label-containing region to a reference label configuration selected from the multiple reference label configurations contained in the reference label configuration database, and generate a combined representation based on the segmentation information and the closest label match.

Further, the characterization method 700 may be carried out on a specimen testing apparatus 100 including the quality check module 130. The specimen testing apparatus 100 may include a track 121, and a carrier 122 moveable on the track 121. The carrier 122 may be configured to contain and support the specimen container 102 including the one or more labels 218 comprising the label-containing region 618 and containing a serum or plasma portion 212SP of a specimen 212 and carry the specimen container 102 to the quality check module 130 to accomplish the characterization and the pre-screening for the presence of an interferent.

Various selected components, features, or embodiments may be described individually herein. It should be noted that such components, features, or embodiments may be used in substitution with other individually-described components, features, or embodiments, or even in combination with other described components, features, or embodiments herein, as is practical. While the invention is susceptible to various modifications and alternative forms, specific apparatus, system, and methods have been shown by way of example in the drawings and are described in detail herein. It should be understood, however, that it is not intended to limit the disclosure to the particular apparatus, systems, and methods disclosed but, to the contrary, the intention is to cover all modifications, equivalents, and alternatives falling within the scope of the appended claims.

What is claimed is:

1. A characterization method, comprising:
   capturing one or more images from multiple viewpoints of a specimen container including a serum or plasma portion, wherein the specimen container includes one or more labels thereon;
   processing the one or more images from the multiple viewpoints to provide segmentation data for each of the multiple viewpoints, the segmentation data including identification of a label-containing region;
   providing a reference label configuration database including reference image data on multiple reference label configurations;
   identifying and selecting a closest label match of the label-containing region to a reference label configuration selected from the multiple reference label configurations contained in the reference label configuration database; and
   generating a combined representation based on the segmentation data and the closest label match.

2. The method of claim 1, comprising determining at least one of:
   hemolysis, icterus, and/or lipemia, or
   normality of the serum or plasma portion taking into account the one or more labels by using the combined representation.

3. The method of claim 1, wherein generating a combined representation comprises calculating, on a pixel by pixel basis, a difference between, a ratio between, or a concatenation of, the label-containing region to the reference label configuration selected from the multiple reference label configurations.

4. The method of claim 1, wherein the reference label configuration database comprises image data regarding different reference label configurations.

5. The method of claim 4, wherein the image data regarding the different reference label configurations has been entered prior to the processing of the one or more images from the multiple viewpoints.

6. The method of claim 4, wherein the reference label configuration database is made up of sub-databases capable of being indexed by an indexer.

7. The method of claim 4, wherein the reference label configuration database is made up of sub-databases indexed by tube size.

8. The method of claim 4, wherein the reference label configuration database is made up of sub-databases indexed by label size.

9. The method of claim 4, wherein the reference label configuration database is made up of sub-databases indexed by label location.

10. The method of claim 1, wherein the identifying and selecting the closest label match the closest label match of the label-containing region to the reference label configuration comprises minimizing a difference between the label-containing region to the reference label configuration.

11. The method of claim 10 wherein determining a closest match comprises down scaling of the segmentation data of the label-containing region to match a relative scale of the reference label configuration database.

12. The method of claim 1, wherein the segmentation data is generated on the serum or plasma portion through the label-containing region.

13. The method of claim 1, comprising generating a semantic map from the segmentation data from each of the multiple viewpoints.

14. The method of claim 13, comprising selecting a synthetic viewpoint that has maximum visibility of the serum or plasma portion.

15. The method of claim 1, wherein the capturing the one or more images from the multiple viewpoints comprises backlighting with light sources comprising one or more spectra of R, G, B, white light, IR, and near IR.

16. The method of claim 15, wherein the capturing the one or more images from the multiple viewpoints comprises exposure at different exposure times for each of the one or more spectra.

17. The method of claim 1, wherein barcode data in the segmentation data of the label-containing region is ignored.

18. A quality check module, comprising:
   a plurality of image capture devices arranged around an imaging location, and configured to capture multiple images from multiple viewpoints of a specimen container including one or more labels and containing a serum or plasma portion of a specimen; and
   a computer coupled to the plurality of image capture devices and adapted to process image data of the multiple images, the computer configured and capable of being operated to:
      process the multiple images from the multiple viewpoints to provide segmentation data for each of the multiple viewpoints, the segmentation data including identification of a label-containing region,
      store a reference label configuration database including reference image data on multiple reference label configurations, determine a closest label match of the label-containing region to a reference label configuration selected from the multiple reference label configurations contained in the reference label configuration database, and generate a combined representation based on the segmentation data and the closest label match.

19. The quality check module of claim 18, comprising determining HILN of the serum or plasma portion taking into account the label-containing region with an HILN classifier using the combined representation.

20. A specimen testing apparatus, comprising:

a track;

a carrier moveable on the track and configured to contain a specimen container including one or more labels and containing a serum or plasma portion of a specimen;

a plurality of image capture devices arranged around the track and configured to capture multiple images of the specimen container and specimen from multiple viewpoints; and a computer coupled to the plurality of image capture devices and adapted to process image data of the multiple images, the computer configured and capable of being operated to:

process the multiple images from the multiple viewpoints to provide segmentation data for each of the multiple viewpoints, the segmentation data including identification of a label-containing region, store a reference label configuration database including reference image data on multiple reference label configurations, determine a closest label match of the label-containing region to a reference label configuration selected from the multiple reference label configurations contained in the reference label configuration database, and generate a combined representation based on the segmentation data and the closest label match.

* * * * *